(12) United States Patent
Kamalsky et al.

(10) Patent No.: US 12,499,443 B2
(45) Date of Patent: *Dec. 16, 2025

(54) SECURE CONTROL OF TRANSACTIONS USING BLOCKCHAIN

(71) Applicant: eBay Inc., San Jose, CA (US)

(72) Inventors: David John Kamalsky, Campbell, CA (US); Vidit Aggarwal, Sunnyvale, CA (US); Seyed-Mahdi Pedramrazi, San Jose, CA (US); Ethan Benjamin Rubinson, Santa Clara, CA (US); Sachin Tilloo, Fremont, CA (US); Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,945

(22) Filed: Sep. 22, 2023

(65) Prior Publication Data

US 2024/0013209 A1 Jan. 11, 2024

Related U.S. Application Data

(63) Continuation of application No. 16/041,658, filed on Jul. 20, 2018, now Pat. No. 11,803,847.

(Continued)

(51) Int. Cl.
*G06Q 20/08* (2012.01)
*G06F 21/10* (2013.01)
(Continued)

(52) U.S. Cl.
CPC ........... *G06Q 20/389* (2013.01); *G06F 21/10* (2013.01); *G06F 21/30* (2013.01); *G06F 21/602* (2013.01);
(Continued)

(58) Field of Classification Search
CPC ............. G06Q 20/389; G06Q 20/0855; G06Q 20/3825; G06Q 20/3829; G06Q 20/401;
(Continued)

(56) References Cited

U.S. PATENT DOCUMENTS 5,557,088 A 9/1996 Shimizu et al.
5,607,350 A 3/1997 Levasseur et al.
(Continued)

FOREIGN PATENT DOCUMENTS

CN 106130738 A 11/2016
CN 106777923 A 5/2017
(Continued)

OTHER PUBLICATIONS

Ethereum Wallets are Enabling Transaction Scheduling, Killer Feature, Ethereum News, Retrieved from the Internet URL: <https://www.ccn.com/ethereum-wallets-are-enabling-transaction-scheduling-killer-feature/>, Sep. 18, 2018, 6 pages.

(Continued)

*Primary Examiner* — Patrick Mcatee
*Assistant Examiner* — Zesheng Xiao
(74) *Attorney, Agent, or Firm* — Shook Hardy & Bacon L.L.P.

(57) ABSTRACT

Technologies are shown for controlling a transaction on a blockchain. A first block is created on a blockchain for a transaction involving a seller entity associated with a first key, a buyer entity associated with a second key, and an intermediary entity associated with a third key. Funds for the transaction are associated with the first block. A second block storing refund code is created and linked to the first block. The refund code is executable to refund the funds when a seller digital signature using the first key and/or an intermediary digital signature using the third key are received. A third block storing payment code is created and (Continued)

linked to the first block. The payment code is executable to transfer the funds when a buyer digital signature using the second key and/or an intermediary digital signature using the third key are received.

20 Claims, 19 Drawing Sheets

Related U.S. Application Data

(60) Provisional application No. 62/612,091, filed on Dec. 29, 2017.

(51) Int. Cl.

| | |
|---|---|
| *G06F 21/30* | (2013.01) |
| *G06F 21/60* | (2013.01) |
| *G06F 21/62* | (2013.01) |
| *G06Q 20/38* | (2012.01) |
| *G06Q 20/40* | (2012.01) |
| *G06Q 20/42* | (2012.01) |
| *G06Q 30/018* | (2023.01) |
| *G06Q 40/08* | (2012.01) |
| *H04L 9/06* | (2006.01) |
| *H04L 9/30* | (2006.01) |
| *H04L 9/32* | (2006.01) |
| *H04L 9/40* | (2022.01) |
| *H04L 65/612* | (2022.01) |
| *H04L 67/53* | (2022.01) |
| *H04L 67/63* | (2022.01) |
| *G06F 16/18* | (2019.01) |
| *G06F 16/27* | (2019.01) |
| *G06F 21/64* | (2013.01) |
| *H04L 9/00* | (2022.01) |
| *H04L 67/52* | (2022.01) |

(52) U.S. Cl.
CPC .......... *G06F 21/62* (2013.01); *G06F 21/6218* (2013.01); *G06F 21/6245* (2013.01); *G06Q 20/0855* (2013.01); *G06Q 20/3825* (2013.01); *G06Q 20/3829* (2013.01); *G06Q 20/401* (2013.01); *G06Q 20/42* (2013.01); *G06Q 30/018* (2013.01); *G06Q 40/08* (2013.01); *H04L 9/0637* (2013.01); *H04L 9/0643* (2013.01); *H04L 9/30* (2013.01); *H04L 9/3236* (2013.01); *H04L 9/3239* (2013.01); *H04L 9/3247* (2013.01); *H04L 9/3297* (2013.01); *H04L 63/102* (2013.01); *H04L 63/12* (2013.01); *H04L 65/612* (2022.05); *H04L 67/53* (2022.05); *H04L 67/63* (2022.05); *G06F 16/1805* (2019.01); *G06F 16/27* (2019.01); *G06F 21/645* (2013.01); *G06F 2221/2107* (2013.01); *H04L 9/50* (2022.05); *H04L 67/52* (2022.05); *H04L 2209/56* (2013.01)

(58) Field of Classification Search
CPC ...... G06Q 20/42; G06Q 30/018; G06Q 40/08; G06F 16/27; G06F 16/1805; G06F 21/10; G06F 21/30; G06F 21/602; G06F 21/62; G06F 21/6218; G06F 21/6245; G06F 21/645; G06F 2221/2107; H04L 9/0637; H04L 9/0643; H04L 9/30; H04L 9/3236; H04L 9/3239; H04L 9/3247; H04L 9/3297; H04L 63/102; H04L 63/12; H04L 65/4084; H04L 67/20; H04L 67/327; H04L 67/18; H04L 2209/38; H04L 2209/56

See application file for complete search history.

(56) References Cited

U.S. PATENT DOCUMENTS

| | | |
|---|---|---|
| 7,627,531 B2 | 12/2009 | Breck et al. |
| 7,656,271 B2 | 2/2010 | Ehrman et al. |
| 9,635,000 B1 | 4/2017 | Muftic |
| 9,641,342 B2 | 5/2017 | Sriram et al. |
| 9,680,799 B2 | 6/2017 | Iyer et al. |
| 9,722,790 B2 | 8/2017 | Ebrahimi |
| 9,749,140 B2 | 8/2017 | Oberhauser et al. |
| 9,749,297 B2 | 8/2017 | Gvili |
| 9,774,578 B1 | 9/2017 | Ateniese et al. |
| 9,794,074 B2 | 10/2017 | Toll et al. |
| 9,849,364 B2 | 12/2017 | Tran et al. |
| 10,022,613 B2 | 7/2018 | Tran et al. |
| 10,715,323 B2 | 7/2020 | Chan et al. |
| 10,764,067 B2 | 9/2020 | Lewison et al. |
| 10,839,386 B2 | 11/2020 | Kamalsky et al. |
| 11,115,205 B2 | 9/2021 | Bitauld et al. |
| 11,130,042 B2 | 9/2021 | Tran et al. |
| 11,803,847 B2 | 10/2023 | Kamalsky et al. |
| 2004/0024688 A1 | 2/2004 | Bi et al. |
| 2004/0192437 A1* | 9/2004 | Amaitis ............... G07F 17/3288 463/26 |
| 2006/0100965 A1 | 5/2006 | Simelius |
| 2013/0174272 A1 | 7/2013 | Chevalier et al. |
| 2013/0219458 A1 | 8/2013 | Ramanathan |
| 2015/0269538 A1 | 9/2015 | Stanchfield |
| 2015/0302400 A1 | 10/2015 | Metral |
| 2015/0332283 A1 | 11/2015 | Witchey |
| 2016/0028552 A1 | 1/2016 | Spanos et al. |
| 2016/0191243 A1 | 6/2016 | Manning |
| 2016/0203572 A1 | 7/2016 | Mcconaghy et al. |
| 2016/0284033 A1 | 9/2016 | Winand |
| 2016/0300234 A1 | 10/2016 | Moss-pultz et al. |
| 2016/0321752 A1 | 11/2016 | Tabacco |
| 2016/0330034 A1 | 11/2016 | Back et al. |
| 2016/0335533 A1 | 11/2016 | Davis |
| 2016/0342976 A1 | 11/2016 | Davis |
| 2016/0342977 A1 | 11/2016 | Lam |
| 2016/0358184 A1 | 12/2016 | Radocchia et al. |
| 2016/0379212 A1 | 12/2016 | Bowman et al. |
| 2017/0005804 A1 | 1/2017 | Zinder |
| 2017/0011460 A1 | 1/2017 | Molinari et al. |
| 2017/0046526 A1 | 2/2017 | Chan et al. |
| 2017/0046651 A1 | 2/2017 | Lin et al. |
| 2017/0046664 A1 | 2/2017 | Haldenby et al. |
| 2017/0046693 A1 | 2/2017 | Haldenby et al. |
| 2017/0048209 A1 | 2/2017 | Lohe et al. |
| 2017/0078493 A1 | 3/2017 | Melika et al. |
| 2017/0103385 A1 | 4/2017 | Wilson et al. |
| 2017/0103390 A1 | 4/2017 | Wilson et al. |
| 2017/0109735 A1 | 4/2017 | Sheng et al. |
| 2017/0116693 A1 | 4/2017 | Rae et al. |
| 2017/0132620 A1* | 5/2017 | Miller ................... H04L 9/0637 |
| 2017/0132630 A1 | 5/2017 | Castinado et al. |
| 2017/0149560 A1 | 5/2017 | Shah |
| 2017/0177898 A1 | 6/2017 | Dillenberger |
| 2017/0232300 A1 | 8/2017 | Tran et al. |
| 2017/0236102 A1 | 8/2017 | Biton |
| 2017/0236103 A1 | 8/2017 | Biton |
| 2017/0236104 A1 | 8/2017 | Biton |
| 2017/0237570 A1 | 8/2017 | Vandervort |
| 2017/0243193 A1 | 8/2017 | Manian et al. |
| 2017/0250796 A1 | 8/2017 | Samid |
| 2017/0300627 A1 | 10/2017 | Giordano et al. |
| 2017/0300928 A1 | 10/2017 | Radocchia et al. |
| 2017/0302663 A1 | 10/2017 | Nainar et al. |
| 2017/0308872 A1 | 10/2017 | Uhr et al. |
| 2017/0317997 A1 | 11/2017 | Smith et al. |
| 2017/0329980 A1 | 11/2017 | Hu et al. |
| 2017/0331810 A1 | 11/2017 | Kurian |
| 2017/0337534 A1 | 11/2017 | Goeringer et al. |
| 2017/0338967 A1 | 11/2017 | Lewison et al. |
| 2017/0345011 A1 | 11/2017 | Salami et al. |
| 2017/0366353 A1 | 12/2017 | Struttmann |
| 2018/0018723 A1 | 1/2018 | Nagla et al. |
| 2018/0025442 A1 | 1/2018 | Isaacson et al. |

(56) References Cited

U.S. PATENT DOCUMENTS

| | | |
|---|---|---|
| 2018/0078843 A1 | 3/2018 | Tran et al. |
| 2018/0091524 A1 | 3/2018 | Setty et al. |
| 2018/0101844 A1 | 4/2018 | Song et al. |
| 2018/0117447 A1 | 5/2018 | Tran et al. |
| 2018/0143995 A1 | 5/2018 | Bailey et al. |
| 2018/0173719 A1 | 6/2018 | Bastide et al. |
| 2018/0257306 A1 | 9/2018 | Mattingly et al. |
| 2018/0294957 A1 | 10/2018 | O'Brien et al. |
| 2018/0309569 A1 | 10/2018 | Martin et al. |
| 2018/0330348 A1 | 11/2018 | Uhr et al. |
| 2018/0330349 A1 | 11/2018 | Uhr et al. |
| 2018/0349621 A1 | 12/2018 | Schvey et al. |
| 2018/0349893 A1 | 12/2018 | Tsai |
| 2019/0102409 A1 | 4/2019 | Shi et al. |
| 2019/0109713 A1 | 4/2019 | Clark et al. |
| 2019/0172057 A1 | 6/2019 | Vincent |
| 2019/0179801 A1 | 6/2019 | Jang et al. |
| 2019/0205558 A1 | 7/2019 | Gonzales, Jr. |
| 2019/0205563 A1 | 7/2019 | Gonzales, Jr. |
| 2019/0205870 A1 | 7/2019 | Kamalsky et al. |
| 2019/0205873 A1 | 7/2019 | Kamalsky et al. |
| 2019/0205894 A1 | 7/2019 | Gonzales et al. |
| 2019/0207995 A1 | 7/2019 | Gonzales, Jr. |
| 2020/0012763 A1 | 1/2020 | Arngren et al. |
| 2020/0036519 A1 | 1/2020 | Bitauld et al. |
| 2020/0119905 A1 | 4/2020 | Revankar et al. |
| 2020/0195436 A1 | 6/2020 | Khan |
| 2021/0035096 A1 | 2/2021 | Kamalsky et al. |

FOREIGN PATENT DOCUMENTS

| | | |
|---|---|---|
| CN | 106920169 A | 7/2017 |
| CN | 107070644 A | 8/2017 |
| CN | 107077682 A | 8/2017 |
| CN | 107086909 A | 8/2017 |
| CN | 107273759 A | 10/2017 |
| EP | 3413254 A1 | 12/2018 |
| KR | 10-1781583 B1 | 9/2017 |
| WO | 2016/128567 A1 | 8/2016 |
| WO | 2017/004527 A1 | 1/2017 |
| WO | 2017/006136 A1 | 1/2017 |
| WO | 2017/027900 A1 | 2/2017 |
| WO | 2017/066002 A1 | 4/2017 |
| WO | 2017/090041 A1 | 6/2017 |
| WO | 2017/098519 A1 | 6/2017 |
| WO | 2017/145003 A1 | 8/2017 |
| WO | 2017/145017 A1 | 8/2017 |
| WO | 2017/145047 A1 | 8/2017 |
| WO | 2017/148245 A1 | 9/2017 |
| WO | 2017/153495 A1 | 9/2017 |
| WO | 2017/163069 A1 | 9/2017 |
| WO | 2017/163220 A1 | 9/2017 |
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2019/133307 A1 | 7/2019 |
| WO | 2019/133308 A1 | 7/2019 |
| WO | 2019/133309 A1 | 7/2019 |
| WO | 2019/133310 A1 | 7/2019 |

OTHER PUBLICATIONS

The Alarm Service Is Now Available on the Testnet, Retrieved from the Internet URL: <http://blog.ethereum-alarm-clock.com/blog/2016/1/16/the-alarm-service-is-now-available-on-the-testnet>, Jan. 16, 2016, 2 pages.

Bhargavan et al., "Short Paper: Formal Verification of Smart Contracts", retrieved From Internet URL<http://research.microsoft.com/en-us/um/people/nswamy/papers/solidether.pdf>, Aug. 27, 2016, pp. 1-6.

Bidder Coin, "Bidder Coin, Bidder Coin White Paper, Dec. 28, 2017, pp. 36", Dec. 28, 2017, 36 pages.

Chainfrog, "What are Smart Contracts?", Retrieved from the Internet URL: <http://www.chainfrog.com/wp-content/uploads/2017/08/smart-contracts.pdf>, 2017, 13 pages.

Chan, "Motif Finding", Retrieved from the Internet URL: <https://www.mathworks.com/matlabcentral/fileexchange/29362-motif-finding>, Nov. 15, 2010, 4 pages.

Chronologic, "Temporal Innovation on the Blockchain", Retrieved from the Internet URL: <https://chronologic.network/uploads/Chronologic_Whitepaper.pdf>, Oct. 11, 2018, 25 pages.

Ethereum, "blockchain—How can a contract run itself at a later time?", Retrieved from the Internet URL:<https://ethereum.stackexchange.com/questions/42/how-can-a-contract-run-itself-at-a-later-time>, Accesses date on Sep. 24, 2018, 12 pages.

Gollapudi, "White Paper—A Next-Generation Smart Contract and Decentralized Application Platform", Retrieved from the Internet URL: < https://github.com/ethereum/wiki/wiki/White-Paper/f18902f4e7fb21dc92b37e8a0963eec4b3f4793a >, May 29, 2017, pp. 1-23.

Huckle et al., "Internet ofThings, Blockchain and Shared Economy Applications", Procedia Computer Science. Elsevier B.V. 98: 463., 2016, pp. 461-466.

Kehrli, "Blockchain Explained", Retrieved from the Internet URL: <https://www.niceideas.ch/blockchain_explained.pdf>, Oct. 7, 2016, pp. 1-25.

Szabo, "Smart Contracts: Building Blocks for Digital Markets", Retrieved online from the Internet URL: <http://www.alamut.com/subj/economics/nick_szabo/smartContracts.html>, 1996, pp. 1-17.

Triantafyllidis, "Developing an Ethereum Blockchain Application", Retrieved from the Internet URL: <http://www.delaat.net/rp/2015-2016/p53/report.pdf >, Feb. 19, 2016, 59 pages.

Adams, "A Tech Startup Wants to Use Blockchain to Make Event Tickets Fraud-Proof", Retrieved from the Internet URL: <https://www.forbes.com/sites/forbestreptalks/2017/06/15/a-tech-startup-upgraded-wants-to-use-blockchain-to-make-event-tickets-fraud-proof-and-to-sell-more-stuff-to-fans/#41659e3a7ffa>, Jun. 15, 2017, 5 pages.

Ateniese, et al., "Redactable Blockchain—or—Rewriting History in Bitcoin and Friends", IEEE European Symposium on Security and Privacy, Mar. 11, 2017, pp. 1-38.

Aventus, "The Aventus Protocol: Blockchain for Ticketing", Retrieved from the Internet URL: <https://aventus.io/>, Accessed on Sep. 11, 2018, 9 pages.

Blocktix, "Blocktix—an Ethereum Event Hosting Platform Designed for the Real World", Retrieved from the Internet URL: <https://blog.blocktix.io/blocktix-an-ethereum-event-hosting-platform-designed-for-the-real-world-d52f8a838ecc>, Jan. 25, 2017, 3 pages.

Chen et al., "Under-Optimized Smart Contracts Devour Your Money", Retrieved from the Internet URL: <https://arxiv.org/pdf/1703.03994.pdf>, Mar. 11, 2016, 5 pages.

Cloudchain—Ticketing Platform Based on Blockchain—Reply, Retrieved from the Internet URL: <http://www.reply.com/en/content/blockchain-ticketing-solution-cloudchain>, Accessed on Sep. 11, 2018, 3 pages.

Event Chain, "Blockchain Secure Event Ticketing for Music, Festivals and Meetups", Retrieved from the Internet URL: <https://eventchain.io/>, Accessed on Sep. 11, 2018, 9 pages.

Guts Tickets—Honest ticketing, Retrieved from the Internet URL: <https://guts.tickets/>, Accessed on Sep. 11, 2018, 9 pages.

Keane, "Blockchain Startups Take on Ticket Touting, but Will They Gain Traction?", Retrieved from the Internet URL: <https://www.coindesk.com/blockchain-startups-take-ticket-touting-will-gain-traction/>, Jul. 30, 2017, 5 pages.

Kishigami et al., "The Blockchain-Based Digital Content Distribution System", 2015 IEEE Fifth International Conference on Big Data and Cloud Computing, Aug. 1, 2015, pp. 187-190.

Kosterova, "Crypto.tickets", Retrieved from the Internet URL: <https://blog.crypto.tickets/>, Accessed on Sep. 11, 2018, 2 pages.

Ramachandran et al, "Using Blockchain and smart contracts for secure data provenance management", Sep. 28, 2017, pp. 1-11.

Softjourn, "Blockchain Revolutionizes Ticketing", Blockchain in Ticketing. Why do ticketing companies need it?, Retrieved from the Internet URL: <https://softjourn.com/blockchain-in-ticketing>, Accessed on Sep. 11, 2018, 7 pages.

(56) References Cited

OTHER PUBLICATIONS

Steichen, et al., "Blockchain-Based, Decentralized Access Control for IPFS", Retrieved from the Internet URL: <https://www.researchgate.net/publication/327034734>, Jul. 2018, pp. 1499-1506.

Upgraded Tickets, "Digital "Smart" Tickets That Let You Trust Your Tickets and Maximize Your Event Experience", Retrieved from the Internet URL: <https://www.upgraded-inc.com/>, Accessed on Sep. 11, 2018, 14 pages.

White Paper, "White Paper: PGP Key Management Server from Symantec", An Introduction to PGP Key Management Server from Symantec, 2010, 17 pages.

Zhang, "Orthogonality Between Key Privacy and Data Privacy, Revisited", ResearchGate, Conference Paper, Aug. 2007, pp. 1-16.

\* cited by examiner

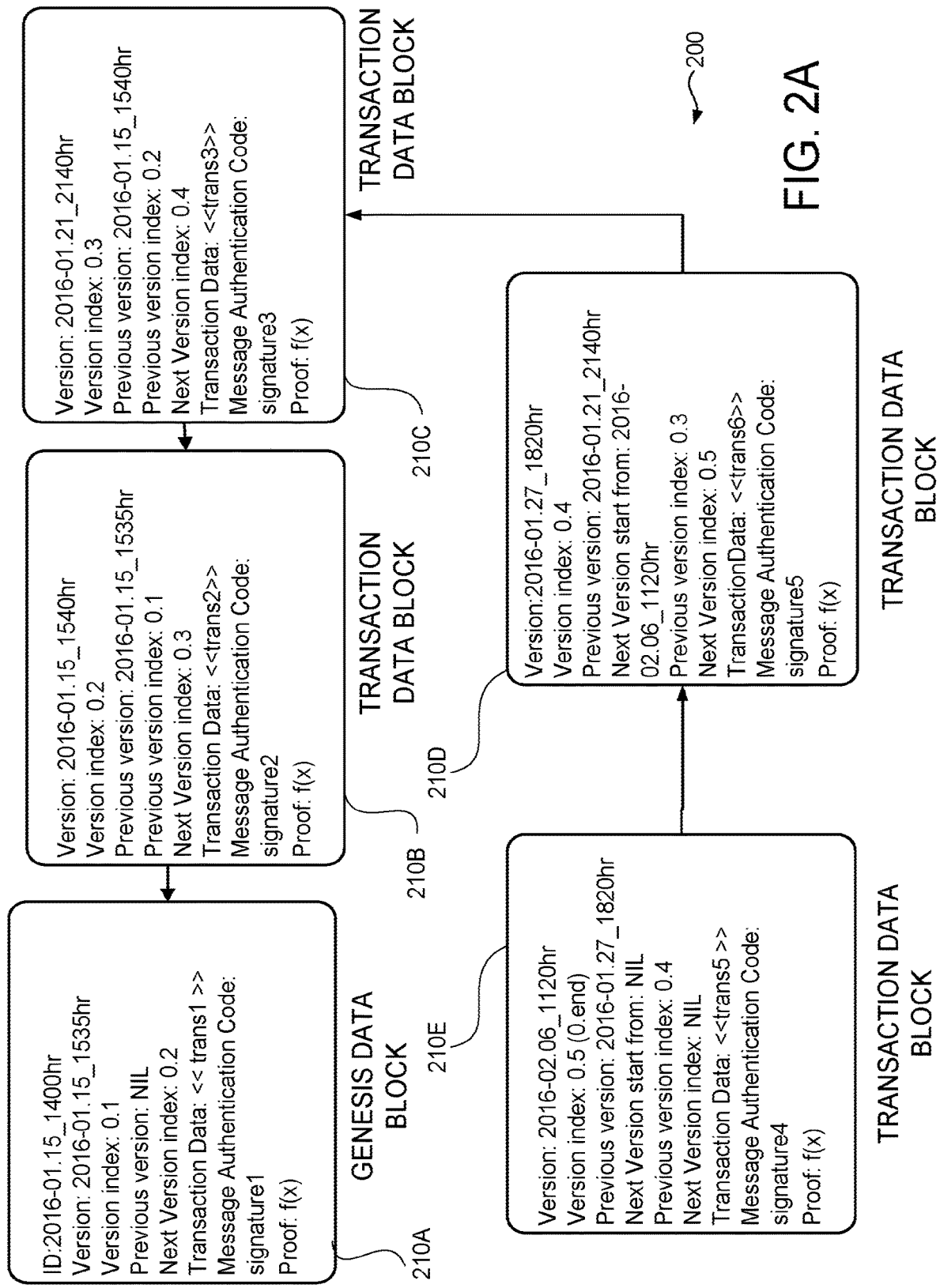

380

INTERMEDIARY SERVER
CREATES AUCTION BLOCK
ON BLOCKCHAIN WITH
INTERMEDIARY AS OWNER
AND INTERNAL STATE
382

BLOCK STATE 384
AUCTION ID:
- owner /* Intermediary */
- seller
- start blockheight /* Block #*/
- AUCTION_STOP_HEIGHT
   /*duration*/
- bid /*current highest*/
- bidder /*current highest*/
- winner
- done

```
METHODS                                    386

CREATE(String id, auctionDetails) /* Called by seller*/
      { auction[id].seller=caller}

BID(int numCoins, String auctionID)
{   if(numCoins > auction[id].bid)
       Release(auction[id].bid, auction[id].bidder)
       auction[id].bid=numCoins
       auction[id].bidder=caller
       }

COMPLETE() /* Only called by owner */
{   if (caller == owner && blockheight >=
AUCTION_STOP_HEIGHT)
       Notify(auction[id].seller)
       auction[id].winner=auction[id].bidder
       auction[id].done=true}

PAYMENT(String AuctionID) /* Owner or winner calls*/
{   if ((caller==owner || caller == auction[id].winner) &&
auction[id].done==true)
       Release(auction[id].bid, auction[id].seller)
       }
```

FIG. 3C

SECURE CONTROL OF TRANSACTIONS USING BLOCKCHAIN

CROSS-REFERENCE TO RELATED APPLICATIONS

This patent application is a continuation of U.S. patent application Ser. No. 16/041,658, filed Jul. 20, 2018, which claims priority to U.S. Provisional Patent Application No. 62/612,091, filed Dec. 29, 2017. Each of the aforementioned applications is herein incorporated by reference in its entirety for all purposes.

BACKGROUND

The use of blockchain platforms, such as a cryptocurrency platform, may provide a faster, cheaper and more reliable payment system, particularly for economic regions that do not have access to safe, established, reliable banking and financial systems. However, the use of cryptocurrency in transactions is problematic because the transactions can be untraceable, unrecallable and volatile.

It is with respect to these and other considerations that the disclosure made herein is presented.

SUMMARY

The disclosed technology is directed toward multisignature smart contract code on a secure blockchain, e.g. the Ethereum blockchain, that provide a traceable, recallable, and non-volatile online payment system. Smart contracts are programs with code that can be executed on a blockchain platform and allow logic to be introduced on top of a transaction.

The disclosed technology is directed toward an intermediary that creates a multisignature blockchain smart contract transaction block for a transaction. Signatures are required from a buyer, a seller, and an intermediary.

In one example, such as an escrow for a transaction, the intermediary holds private keys for release of funds deposited in the blockchain multisignature transaction block by a bidder in the transaction. A multisignature transaction block can include a refund transaction to make a refund to a buyer.

In another example, the disclosed technology is directed toward multisignature transaction blocks utilized to implement an auction approach that secures funds for a bid amount from a bidder and releases the secured funds back to the bidder when a higher bid is submitted by another bidder.

The disclosed technology supports safe, secure, traceable, recallable, and non-volatile online payment using smart contracts on a cryptocurrency blockchain, e.g. the Ethereum blockchain.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2A is a data architecture diagram showing an illustrative example of a transaction data blockchain with transaction data blocks containing transaction data being added to the transaction data blockchain;

FIG. 3C is a data architecture diagram that further illustrates the data blocks for the auction example of FIG. 3B;

DETAILED DESCRIPTION

Figure 1:
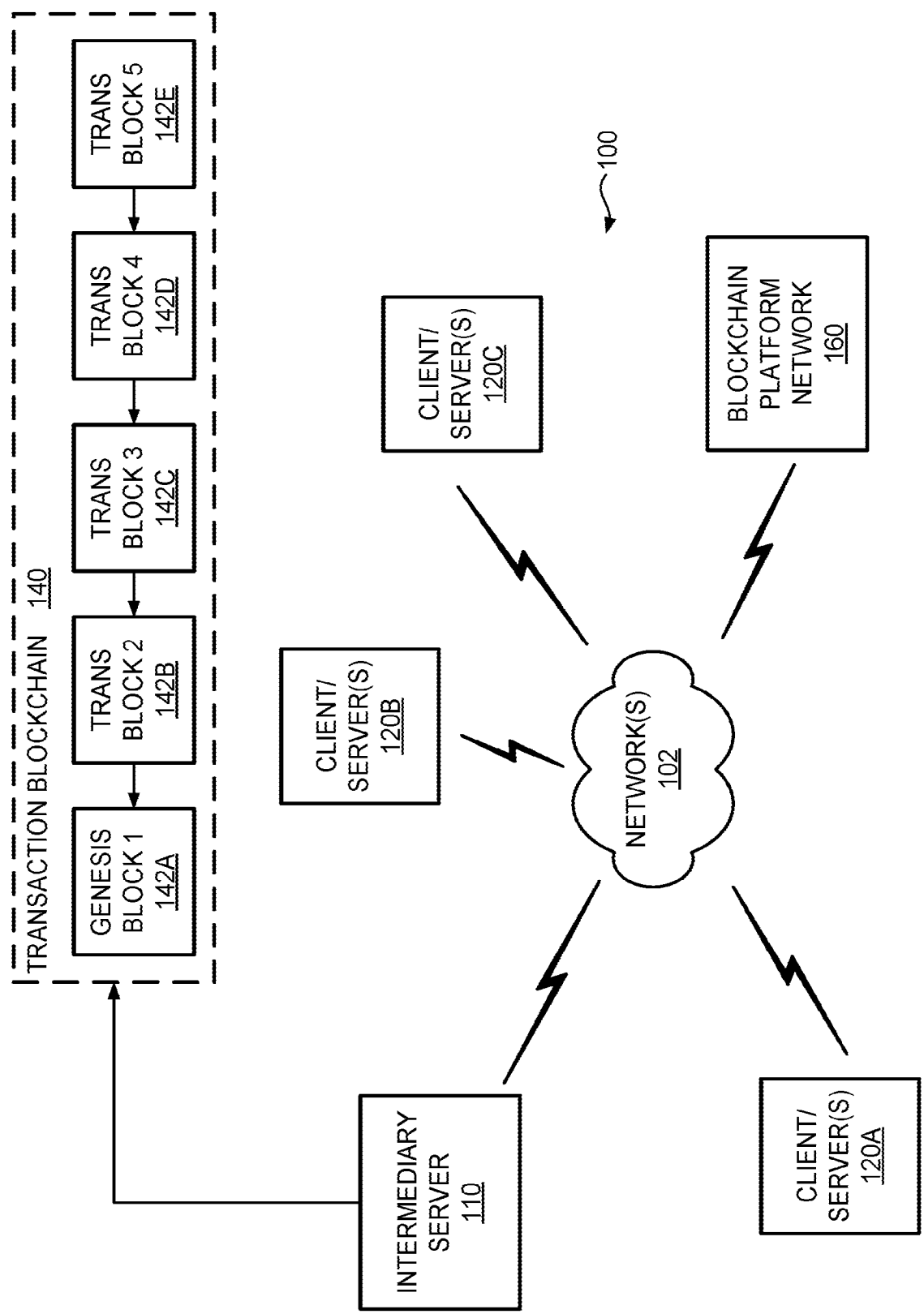
FIG. 1 is an architectural diagram showing an illustrative example of a system for a transaction data blockchain.

The following Detailed Description describes technologies for the use of a blockchain as an escrow to make secure refund or payment of funds committed to the blockchain through the use of transaction data blocks that must be signed by an intermediary entity in order to release funds committed to the blockchain by a buyer or bidder entity for a transaction.

In one example, a first transaction data block is created and linked to the blockchain that can refund funds to a buyer that the buyer committed to the blockchain for payment in a transaction when the first transaction data block is signed by a seller or an intermediary entity. A second transaction data block is created and linked to the blockchain that can pay the funds committed by the buyer to the seller when the buyer or the intermediary entity sign the second transaction data block.

The use of the blockchain leads to enhanced security of transactions because the hash signatures within the Merkel tree provide a mechanism to inspect the integrity of the data. Still further, the use of keys for signatures within the blockchain provide a technical advantage of verification and security that transaction steps are performed.

In another example, public keys for a buyer, seller and intermediary are utilized to create a multisignature public address for the contract data block for the transaction on the blockchain. Release of funds committed to the blockchain for the transaction require signatures from at least two of the buyer, seller and intermediary.

In still another example, the transaction data blocks pertain to an auction secured on a transaction data blockchain, where each bidder commits funds for a bid amount to the blockchain. If a first bidder is outbid by a second bidder, then an intermediary entity can sign a first transaction data block to release the funds committed by the first bidder back to the first bidder. If the auction finishes, then the intermediary entity can sign a second transaction data block to pay the funds committed by the winning bidder to a seller entity.

In some examples, both a buyer signature and an intermediary signature are required on a payment transaction data block to release the committed funds to a seller. Some examples require both a seller signature and an intermediary signature on a refund transaction data block to release the committed funds to the buyer.

In certain examples, script code for methods for controlling the transaction or the bids is stored in the transaction data blocks on the blockchain. The methods can be executed on a blockchain platform supporting the blockchain. By storing the script code in the blockchain, the integrity of the code is verified as secure.

Technical advantages of use of a blockchain in the disclosed technology includes security of funds committed to the blockchain, transparency of the data (which allows for extensibility tools and uses) and code for the transaction data blocks of the blockchain, and an ability to escrow funds for the transaction and release the escrowed funds to an appropriate entity, e.g. buyer or seller.

These are simplified examples and many factors may be considered in a system for maintaining transaction data and auction transaction data using a blockchain as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of auction data, release of funds from the blockchain, or other information pertaining to the transaction data blockchain.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a transaction data blockchain is maintained pertaining to smart contracts requiring multiple signatures, including a signature from an intermediary entity, to release funds to either a buyer entity for a refund transaction or a seller entity for a payment transaction. For example, a payment transaction from the blockchain requires both a buyer signature and an intermediary signature to execute the payment transaction and transfer to a seller of funds committed to the blockchain by the buyer. The disclosed technology thus permits a buyer to commit funds to a blockchain while retaining control over disbursement of the funds to a seller. A refund transaction from the blockchain requires both a seller signature and an intermediary signature to execute the refund transaction and return to the buyer the funds committed to the blockchain by the buyer. The transaction data blockchain and the intermediary essentially provide an escrow for the funds.

In addition, in certain examples, the transaction data blockchain can be used in an auction, wherein a bidder for each bid commits funds for the bid to the blockchain, which assures payment of the bid. The blockchain automatically releases the committed bid funds back to the bidder if the bidder is outbid. When the auction ends, the funds committed to the blockchain by the winning bidder are released to a seller for the auction. The transaction data blockchain, in this example, provides a mechanism to secure bid funds that can be released to bidders who are outbid or released to a seller.

Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for transaction data and auction transaction data blockchain ledgers will be described. As will be described in more detail below with respect to the figures, there are a number of applications and services that may embody the functionality and techniques described herein.

FIG. 1 is an architectural diagram showing an illustrative example of a transaction data management system 100 utilizing a transaction data blockchain 140 to securely maintain data pertaining to transactions implemented utilizing smart contracts in transaction data blocks. In the embodiment of FIG. 1, the transaction data blockchain 140 is based on a blockchain platform that supports smart contracts containing scripts executed by the blockchain platform. Examples of such a blockchain platform include ETHEREUM, which is based on a scripting language called SOLIDIFY or BITCOIN, which is based on a scripting language called SCRIPT.

Intermediary server 110 initiates transaction data blockchain 140 by creating genesis block 142A. Genesis block 142A can include data identifying a transaction involving multiple client/servers 120. The transaction data blocks 142 generally require a signature from intermediary server 110 to release funds committed to the blockchain 140. In some embodiments, the intermediary server 110 may be replaced by another computing node, such as a computer on blockchain platform network 160, or other computing device.

In the example of FIG. 1, the transaction data blockchain 140 maintains data and code for transactions wherein one or more of client/servers 120A, 120B or 120C have committed funds to blockchain 140 and require a signature from intermediary server 110 in order to release the committed funds. Client/servers 120A, 120B or 120C support buyer or seller entities for transactions managed on blockchain 140. The client/servers 120 can communicate with intermediary server 110 as well as a blockchain platform network of servers 160 that support and maintain blockchain 140. For example, the ETHERIUM blockchain platform from the ETHERIUM FOUNDATION of Switzerland provides a decentralized, distributed computing platform and operating system that provides scripting functionality.

Intermediary server 110 controls the transactions data blocks 142 on transaction data blockchain 140 and controls the creation of transaction data blocks for refund and payment of funds committed to the blockchain 140. A payment transaction data block that pays funds to a seller entity requires a signature from the intermediary server 110 and a buyer entity. A refund transaction data block that returns funds to a buyer entity requires a signature from the intermediary server 110 and a seller entity. Though intermediary server 110 maintains control over release of funds committed to the transaction data blockchain 140, the buyer and seller entities also retain control over release of funds.

By securing commitment of funds for the transaction on the blockchain, this approach ensures that the funds to complete a transaction are committed before the transaction is completed. By providing a mechanism to pay committed funds to a seller entity upon signature of the intermediary and the buyer entity, this approach enables payment of committed funds to the seller entity, but the buyer entity retains control over completion of the transaction and release of the funds. By providing a mechanism to refund committed funds to a buyer upon signature of the intermediary and the seller entity, this approach enables return of committed funds to the buyer entity to, in effect, cancel the transaction. By providing access to the transaction data blockchain 140, this approach can provide full or partial transparency to a transaction maintained on the blockchain.

FIG. 2A is a data architecture diagram illustrating a simplified example of a transaction data blockchain ledger 200 based on the blocks 142A-E of the transaction data blockchain ledger 140 of FIG. 1. The transaction data blockchain ledger 200 example of FIG. 2A is simplified to show block headers, metadata and signatures of blocks 210A-E in order to demonstrate a traceable secure transaction data using a blockchain ledger.

In outline, a blockchain ledger may be a globally shared transactional database. The blockchain ledger 200 may be arranged as a Merkle tree data structure, as a linked list, or as any similar data structure that allows for cryptographic integrity. The blockchain ledger 200 allows for verification that data has not been corrupted or tampered with because any attempt to tamper will change a Message Authentication Code (or has) of a block, and other blocks pointing to that block will be out of correspondence. In one embodiment of FIG. 2A, each block may point to another block. A block may comprise one or more transactions. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed-such as exploring whether molecules interact a certain way during a computational search for an efficacious drug compound.

The blocks 210 of transaction data blockchain 200 in the example of FIG. 2A shows transaction data being added and secured with each new transaction data block 210 on the blockchain. In this example, intermediary server 110 of FIG. 1 creates genesis data block 210A with data for a first transaction, trans1. The intermediary server 110 signs the genesis block 210A and the blockchain system within which blockchain 200 is created verifies the genesis data block based on a proof function.

To support another transaction on the transaction data blockchain 200, intermediary server 110 creates transaction data block 210B, which supports a second transaction, trans2, and transaction data block 210B is linked to genesis block 210A. The intermediary server 110 signs transaction data block 210B and commits the block to blockchain 200 for verification by the blockchain platform. Similarly, intermediary server 110 creates transaction data block 210C to add a third transaction, trans3, and links transaction data block 210C to transaction data block 210B. Intermediary server 110 creates transaction data block 210D for a fourth transaction, trans4, and links transaction data block 210D to transaction data block 210C. Further, transaction data block 210E is created by intermediary server 110 for a fifth transaction, trans5, which is linked to transaction data block 210D. In this approach, the transactions are secured on transaction data blockchain 200 and the transactions can be made publicly viewable and traceable back to the genesis data block 210A.

Figure 2B:
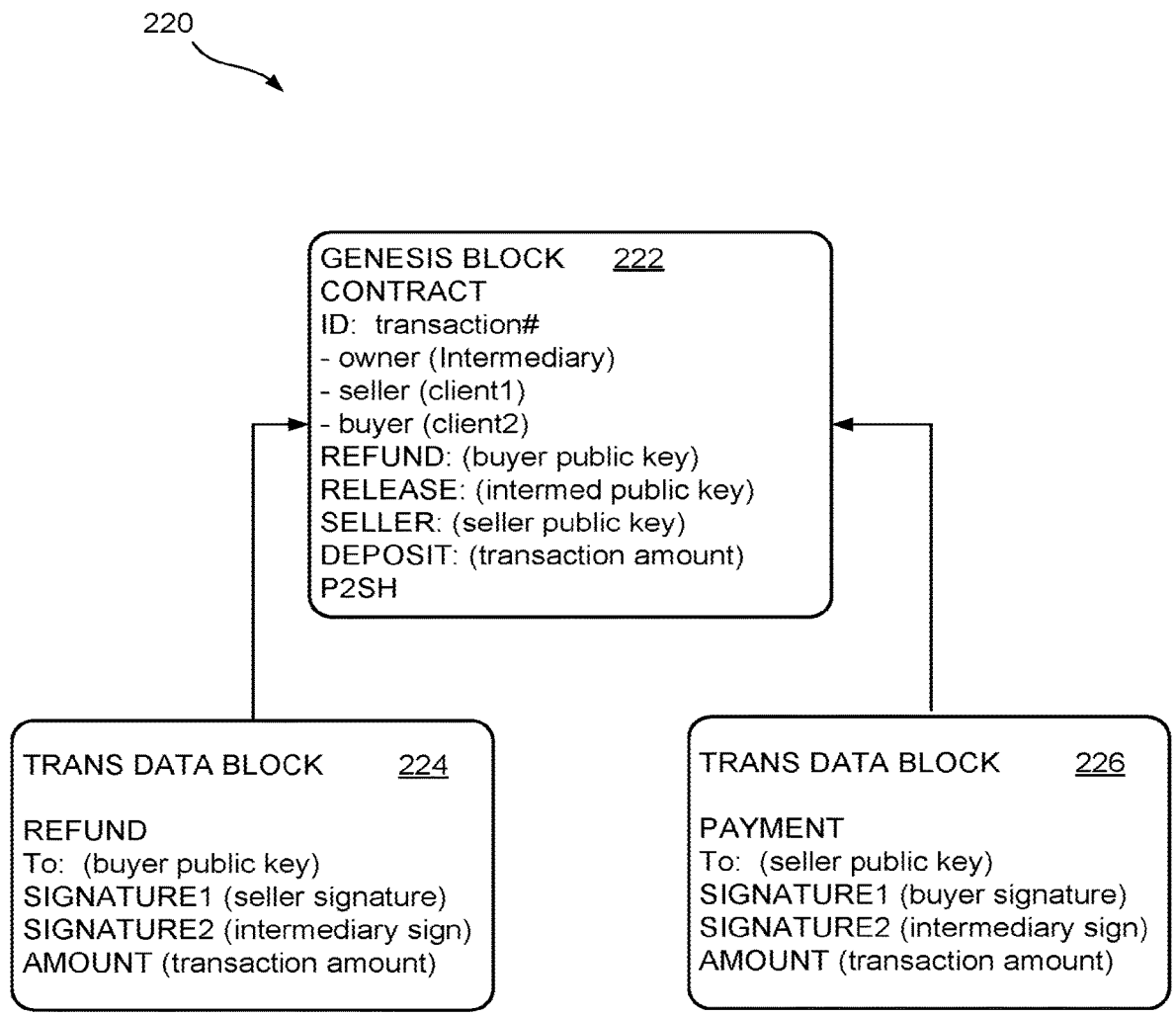
FIG. 2B is a data architecture diagram showing still another illustrative example of a transaction data blockchain pertaining to a refundable transaction that includes a multiple signature refund transaction data block and a multiple signature payment transaction data block.

FIG. 2B is a data architecture diagram showing an illustrative example of a transaction data blockchain 220 where genesis block 222 is created for a transaction along with a refund transaction data block 224 for refunding funds to a buyer and a payment transaction data block 226 for paying funds to a seller.

In this example, a multisignature contract 222 is created that is owned by an intermediary entity corresponding to intermediary server 110 and includes a public key for the intermediary. Multisignature contract 222 also identifies a client corresponding to a seller, client1, and a send-to public key for the seller, as well as identifying a client corresponding to a buyer, client2, and a send-to public key for the buyer. The contract block 222 also includes a pay to script hash (P2SH) function that ensures that funds are only transferred if two of the three parties (buyer, seller and intermediary) sign a transaction. The contract block 222 further provides for deposit of funds for the transaction amount, such as cryptocurrency value.

In the example of FIG. 2B, multisignature contract block 222 is a genesis block for a blockchain. In other examples, the multisignature contract block 222 is a smart contract block added to the cryptocurrency blockchain.

In addition, a refund transaction data block 224 is created and linked to contract block 222. The refund transaction data block 224 includes a send-to public key for the buyer entity and a transaction amount and requires both SIGNATURE1 from the seller entity and SIGNATURE2 from the intermediary entity in order to release the transaction amount to the buyer.

Further, a payment transaction data block 226 is created and linked to contract block 222. The payment transaction data block 226 includes a send-to public key for the seller entity and a transaction amount and requires both SIGNATURE1 from the buyer entity and SIGNATURE2 from the intermediary entity in order to release the transaction amount to the seller.

In this example, the funds deposited in contract block 222 are committed to the transaction on a transaction data blockchain. The committed funds can be released to either the buyer entity or the seller entity. However, the buyer maintains control over whether the committed funds can be released to the seller. At the same time, the seller maintains control over whether the committed funds can be refunded to the buyer. The requirement for a signature from the intermediary entity enables the intermediary to manage disbursement of the committed funds to one of the buyer or seller and effectively hold the funds in escrow on the transaction data blockchain.

Figure 2C:
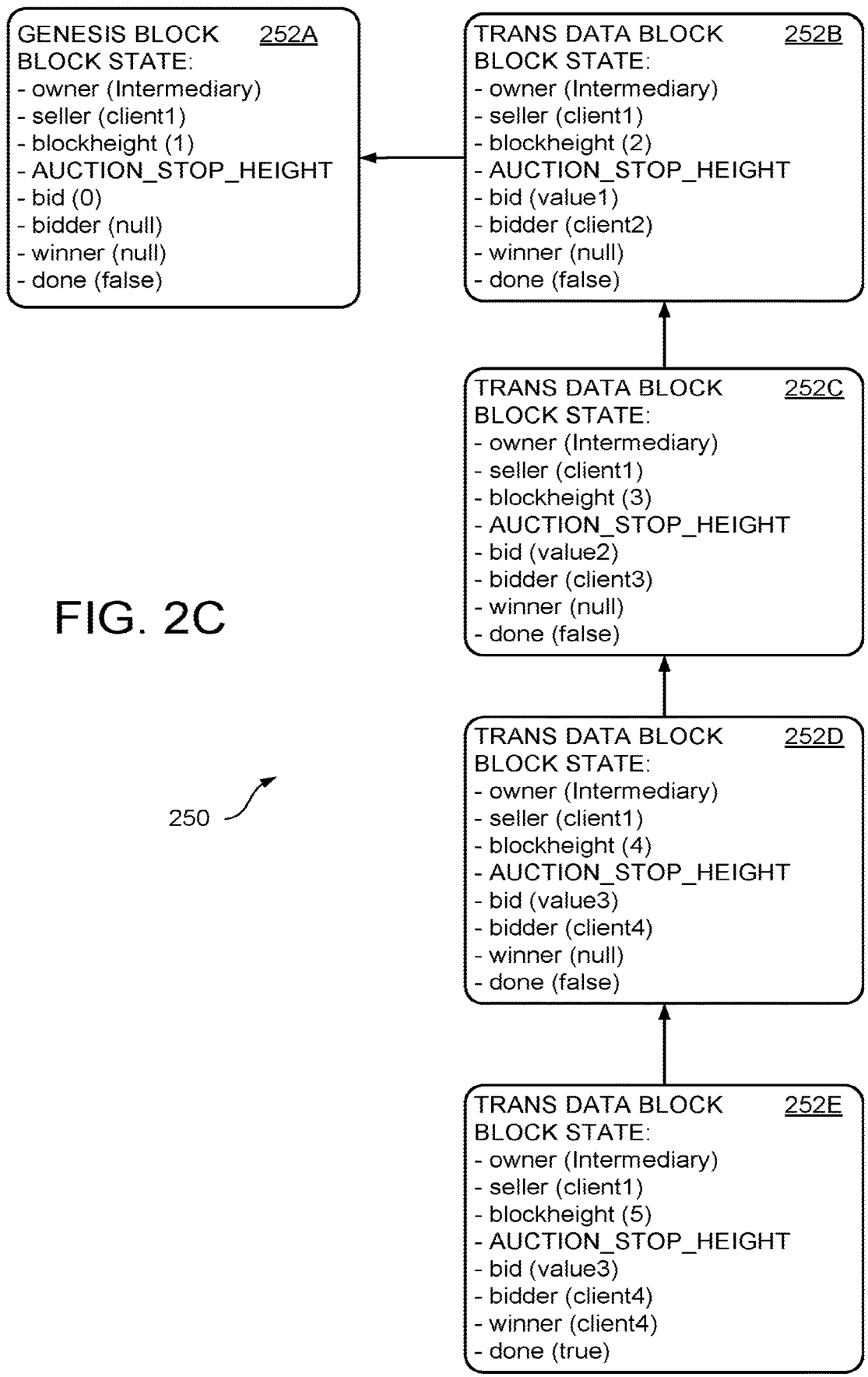
FIG. 2C is a data architecture diagram showing another illustrative example of a transaction data blockchain pertaining to an auction, where each block on the blockchain corresponds to a bid transaction.

FIG. 2C is a data architecture diagram showing another illustrative example of an auction transaction data blockchain 250 pertaining to an auction, where each auction transaction data blocks 252B-252E on the blockchain corresponds to a bid transaction in the auction. In this example, genesis block 252A is created for the auction by, for example, intermediary server 110 of FIG. 1, which is identified as the owner of the block, and the block identifies a seller entity for the transaction, e.g. client1. Genesis block 252A also includes initial block state for the auction, which includes the current blockheight for the auction, e.g. blockheight(1), an AUCTION_STOP_HEIGHT that marks the blockheight that is the end of the auction, and initializes a bid value bid(0), a null current high bidder identifier bidder (null), a null winner identifier winner(null), and done flag done(false).

When a bidder submits a bid, a transaction data block representing the bid is created and linked to the blockchain 250 and the blockheight incremented. In this example, auction transaction data block 252B represents a bid of value1 by bidder client2, which commits the funds for value1 to blockchain 250 at the time of bid and blockheight is incremented to 2. Similarly, auction transaction data block 252C represents a bid of value2 by bidder client3, which commits the funds for value2 to blockchain 250 at the time of bid and blockheight is incremented to 3. Auction transaction data block 252D represents a bid of value3 by bidder client4, which commits the funds for value3 to blockchain 250 at the time of bid and blockheight is incremented to 4. Auction transaction data block 252E represents a bid of value4 by bidder client5, which commits the funds for value4 to blockchain 250 at the time of bid and blockheight is incremented to 5. In this example, blockheight(5) equals the AUCTION_STOP_HEIGHT, which causes client4 to be declared the winner and the done flag is set to true.

Figure 3A:
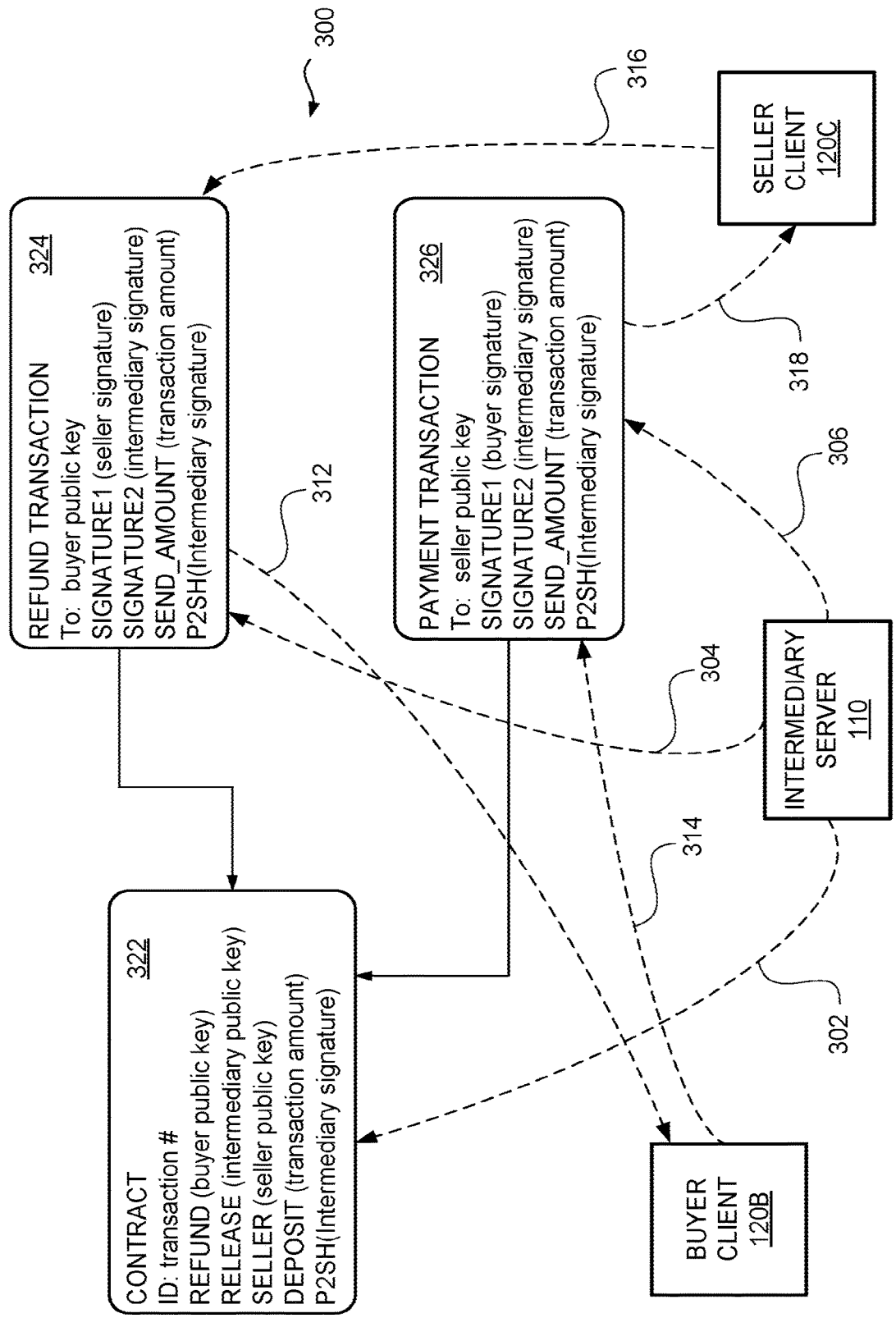
FIG. 3A is a data architecture diagram showing an illustrative example of messaging and data flow for refund or payment transactions conducted on a transaction data blockchain ledger in accordance with the example of FIG. 2B.

FIG. 3A is a data architecture diagram showing an illustrative example of messaging and data flow for refund or payment transactions conducted on the transaction data blockchain ledger 220 of FIG. 2B. In this example, a multisignature contract block 322 is created in a checkout process for a transaction between a buyer associated with buyer client 120B and a seller associated with seller client 120C along with a refund transaction data block 324 for refunding funds to the buyer and a payment transaction data block 326 for paying funds to the seller. The multisignature contract block 322 can be created by a buyer client device 120B, such as a client/server device 120B of FIG. 1, or, as shown in the example of FIG. 3A, the intermediary server 110 at 302.

In this example, buyer client device 120B generates public and private refund keys for a payment transaction. The buyer client device 120B creates a multisignature address using public keys for the buyer, the intermediary and the seller. Multisignature contract block 322 is created having the multisignature address, the buyer's public send-to refund key, public seller send-to address, the intermediary's public address and a P2SH script.

The refund transaction data block 324 and the payment transaction data block 326 are also multisignature transaction blocks that can be generated by the buyer client device 120B or intermediary server 110. In this example, the intermediary server 110 generates refund transaction block 324 with the buyer's public send-to key address and requires the seller's signature, SIGNATURE1 (seller signature), and the intermediary signature, SIGNATURE2 (intermediary signature), in order to send the refund amount, SEND_AMOUNT (transaction amount), to the buyer's public send-to key address.

Intermediary server 110 generates payment transaction block 326 with the seller's public send-to key address and requires the buyer's signature, SIGNATURE1 (buyer signature), and the intermediary signature, SIGNATURE2 (intermediary signature), in order to send the payment amount, SEND AMOUNT(transaction amount), to the seller's public send-to key address. In some examples, a P2SH script in each of the transaction blocks requires an additional signature from the intermediary server before a transfer of funds occurs.

Once the transaction blocks 322, 324 and 326 are created, the buyer deposits funds DEPOSIT (transaction amount), e.g. commits cryptocurrency, into the multisignature address, such as by using a cryptocurrency wallet.

To execute a refund transaction, the seller signs refund transaction block 324, at 316, and the intermediary signs refund transaction block 324, at 304, which causes the transfer, at 312, of SEND_AMOUNT(transaction amount) to the buyer public key address for the buyer. To execute a payment transaction, the buyer signs payment transaction block 326, at 314, and the intermediary signs refund transaction block 326, at 306, which causes the transfer, at 318, of SEND_AMOUNT(transaction amount) to the seller public key address for the seller.

This example demonstrates how the disclosed technology enables a transaction amount to be held in escrow on a blockchain. The disclosed technology permits the escrowed transaction amount to be refunded to the buyer who deposited the transaction amount into the escrow or to be paid to the seller. The buyer retains control over payment of the escrowed funds to the seller and the seller retains control over refund of the escrowed funds to the buyer. The intermediary ensures that the escrowed funds are not paid in the absence of agreement between the parties.

Figure 3B:
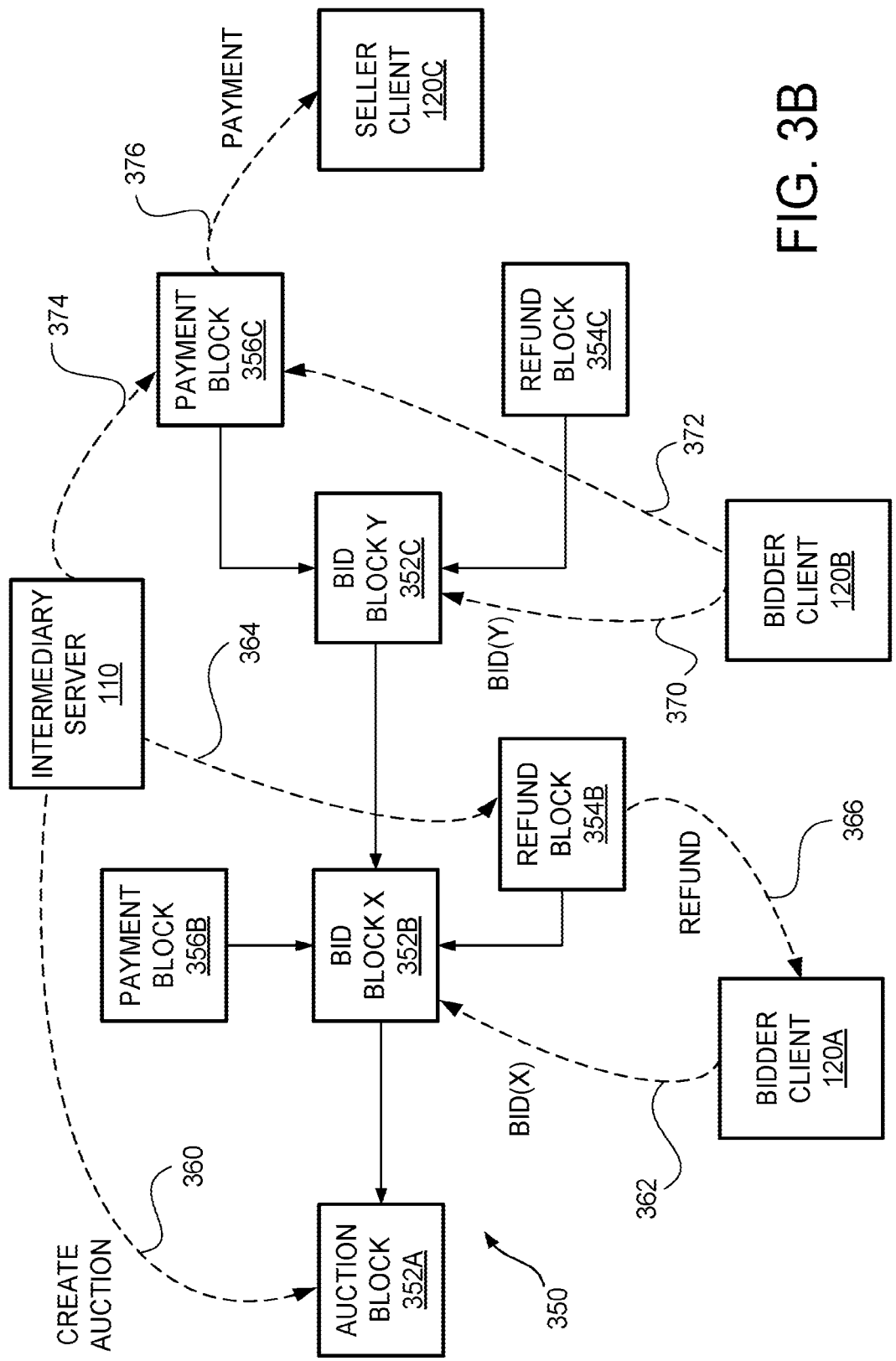
FIG. 3B is a data architecture diagram showing an illustrative example of messaging and data flow for an auction conducted on a transaction data blockchain ledger in accordance with the example of FIG. 2C.

FIG. 3B is a data architecture diagram showing an illustrative example of messaging and data flow 350 for an auction conducted on a transaction data blockchain ledger in accordance with the example of FIG. 2C. The example of FIG. 3B utilizes the approach of FIG. 3A to implement an auction on a blockchain. Submission of a bid creates a contract block that is linked to a genesis block for the auction or to a previous bid block in the auction along with a refund transaction block and a payment transaction block.

In this example, bid funds are committed to the blockchain to fulfill the bid and held in escrow until a higher bid is made or the auction ends. When a bidder is subsequently outbid, the bid funds committed to the blockchain to fulfill the bid are refunded to the bidder using the refund transaction block. If the auction ends, then the bid funds committed by the winning bidder are transferred to the seller using the payment transaction block.

In the example of FIG. 3B, intermediary server 110 creates a genesis auction contract data block 352A for the auction blockchain 350. For example, intermediary server 110 may create the auction in response to a request from seller client 120C that is offering an item for auction. Auction contract data block 352A identifies the intermediary of intermediary server 110 as the owner, identifies the seller associated with seller client 120C, initializes a starting blockheight, sets an AUCTION_STOP_HEIGHT to determine a duration of the auction (e.g. number of bids), initializes the current bid, bidder and winner to null, and initializes a done flag to false.

When a bid is submitted, e.g. BID(X) from bidder client 120A, another auction data block 352 similar to the contract block 322 in FIG. 3A is created and linked to a previous auction contract data block. Also created for each bid and linked to the new auction contract data block 352 is a refund data block 354 similar to refund data block 324 and a payment data block 356 similar to payment data block 326. The refund block 354 is configured to transfer the committed bid funds back to the bidder upon being outbid. The refund block 354 transfers the bid funds to the bidder upon the signature of intermediary server 110. The payment block 356 is configured to transfer the committed bid funds to the seller identified in the auction data blocks 352 upon signature of the winning bidder and intermediary server 110.

In the example of FIG. 3B, at 362, a first bidder client 120A, i.e. a client device used by a first bidder, submits a bid, BID(X), to the auction blockchain represented by auction genesis block 352A and commits the funds for BID(X) to the blockchain 350. An auction data block 352B for BID(X) is added to the blockchain and linked to the genesis auction data block 352A. Refund block 354B is created and linked to auction data block 352B and is configured to transfer the BID(X) funds back to the first bidder when signed by intermediary server 110. Payment block 356B is created and linked to auction data block 352B and is configured to transfer the BID(X) funds to the seller when signed by the first bidder client using bidder client 120A and intermediary server 110.

At 370, a second bidder client 120B, i.e. a client device used by a second bidder, submits a higher bid, BID(Y), and commits the funds for BID(Y) to the auction blockchain 350. An auction data block 352C for BID(Y) is added to the blockchain 350 and linked to the previous auction data block 352B. Refund block 354C is created and linked to auction data block 352C and is configured to transfer the BID(Y) funds back to the second bidder when signed by intermediary server 110. Payment block 356C is created and linked to auction data block 352C and is configured to transfer the BID(Y) funds to the seller when signed by the second bidder client using bidder client 120B and intermediary server 110.

Due to the submittal of a higher bid, at 364, intermediary server 110 signs refund block 354B to return the BID(X) funds to the first bidder, at 366. Thus, the submittal of a higher bid to auction blockchain 350 causes the funds committed by a bidder to the auction blockchain to fulfill a superseded bid to be automatically refunded to that bidder.

In the example of FIG. 3B, when the auction ends, intermediary server 110 signs payment block 356C to authorize transfer of the BID(Y) funds to the seller, e.g. the seller using seller client 120C. The intermediary server 110 may also notify the seller that the auction has ended so that the seller can take action to deliver the item or service that was the subject of the auction. Upon satisfactory receipt of the auction item or service, the second bidder, at 372, signs payment block 356C to effect payment of the BID(Y) funds to the seller, at 376.

FIG. 3C is a data architecture diagram showing an illustrative example of an auction data block 380 for the auction conducted in the example of FIG. 3B that illustrates examples of block state for the auction and code for the auction transactions that are secured on the transaction data blockchain. In this example, at 382, intermediary server 110 creates the auction data block with the initial block state 384 for the auction.

Methods 386 are provided within the auction data block 380 that can be executed on a blockchain platform used to support the auction blockchain. In this example, a CREATE method can be called by a seller to initiate the auction, provide auction details, e.g. the auction item and associated information, and identify the seller.

A BID method can be called by bidders, the bidders of bidder clients 120A and 120B, to submit bids to the blockchain auction. The value of the bid, numCoins, is compared to the current high bid, auction[id].bid, and, if the new bid is higher, then the funds for the previous bid are refunded to the outbid bidder, e.g. Release(auction[id].bid, auction[id].bidder), the submitted bid is set to the current high bid, auction[id].bid=numCoins, and the submitting bidder is set to the current high bidder, auction[id].bidder-caller.

In this example, intermediary server 110, as the owner of the auction data block, periodically checks the block state of the auction block to determine whether the auction should end, which is determined based on blockheight, e.g. if (caller==owner && blockheight>=AUCTION_STOP_HEIGHT). If the end of the auction is reached, then the seller is notified, Notify (auction[id].seller), the winner is set to the current high bidder, auction[id].winner=auction[id].bidder, and the done flag is set to true, auction[id].done=true.

A PAYMENT method can be called, in this example, by either the owner of the auction, e.g. the intermediary server that owns the auction, or the winning bidder, e.g. auction [id].winner, which results in the current high bid amount being released to the seller, e.g. Release(auction[id].bid, auction[id].seller).

A variety of approaches to the methods and auction state data can be utilized without departing from the disclosed technology.

Figure 4A:
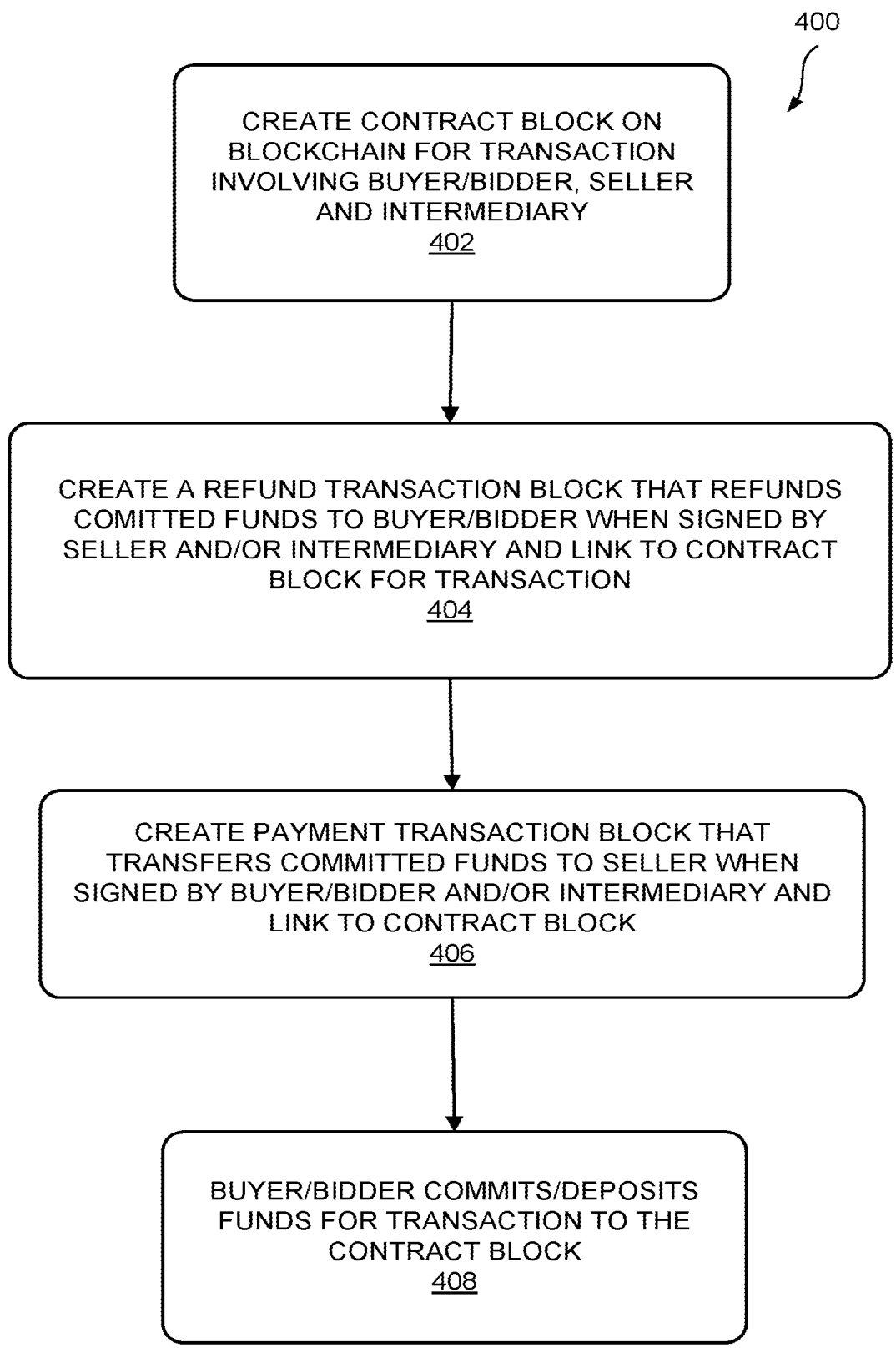
FIG. 4A is a control flow diagram illustrating an example of a process for establishing a smart contract on the transaction data blockchain that includes transaction data blocks with multiple signatures for refund or payment of funds from the transaction data blockchain.

FIG. 4A is a control flow diagram illustrating an example of a process 400 for establishing a smart contract on the transaction data blockchain that includes transaction data blocks with multiple signatures for refund or payment of funds from the transaction data blockchain. The process can be utilized for either the blockchain escrow example of FIG. 3A or the auction blockchain example of FIG. 3B.

At 402, a contract block for a transaction or a bid, such as contract block 322 of FIG. 3A or bid block 352B of FIG. 3B, is created on a blockchain, where the transaction involves a buyer/bidder, a seller, and an intermediary. At 404, a refund transaction block, such as refund transaction block 324 of FIG. 3A or refund transaction block 354B of FIG. 3B, is created and linked to the contract block for the transaction. The refund transaction block is configured to refund to the buyer/bidder the funds committed by the buyer/bidder to the blockchain for the transaction when the refund transaction block is signed by the seller and/or the intermediary.

At 406, a payment transaction block, such as payment transaction block 326 of FIG. 3A or refund transaction block 356B of FIG. 3B, is created and linked to the contract block for the transaction. The payment transaction block is configured to transfer to the seller the funds committed by the buyer/bidder to the blockchain for the transaction when the payment transaction block is signed by the buyer/bidder and/or the intermediary. At 408, the buyer/bidder commits or deposits funds, such as cryptocurrency, to the contract block for fulfillment of the transaction or bid.

Note that the operations described with regard to process 400 may be performed in different orders and with different specific implementation details without departing from the disclosed technology. For example, different approaches to generating and utilizing signatures from the buyer/bidder, seller and intermediary can be implemented, as is demonstrated in FIG. 4B.

Figure 4B:
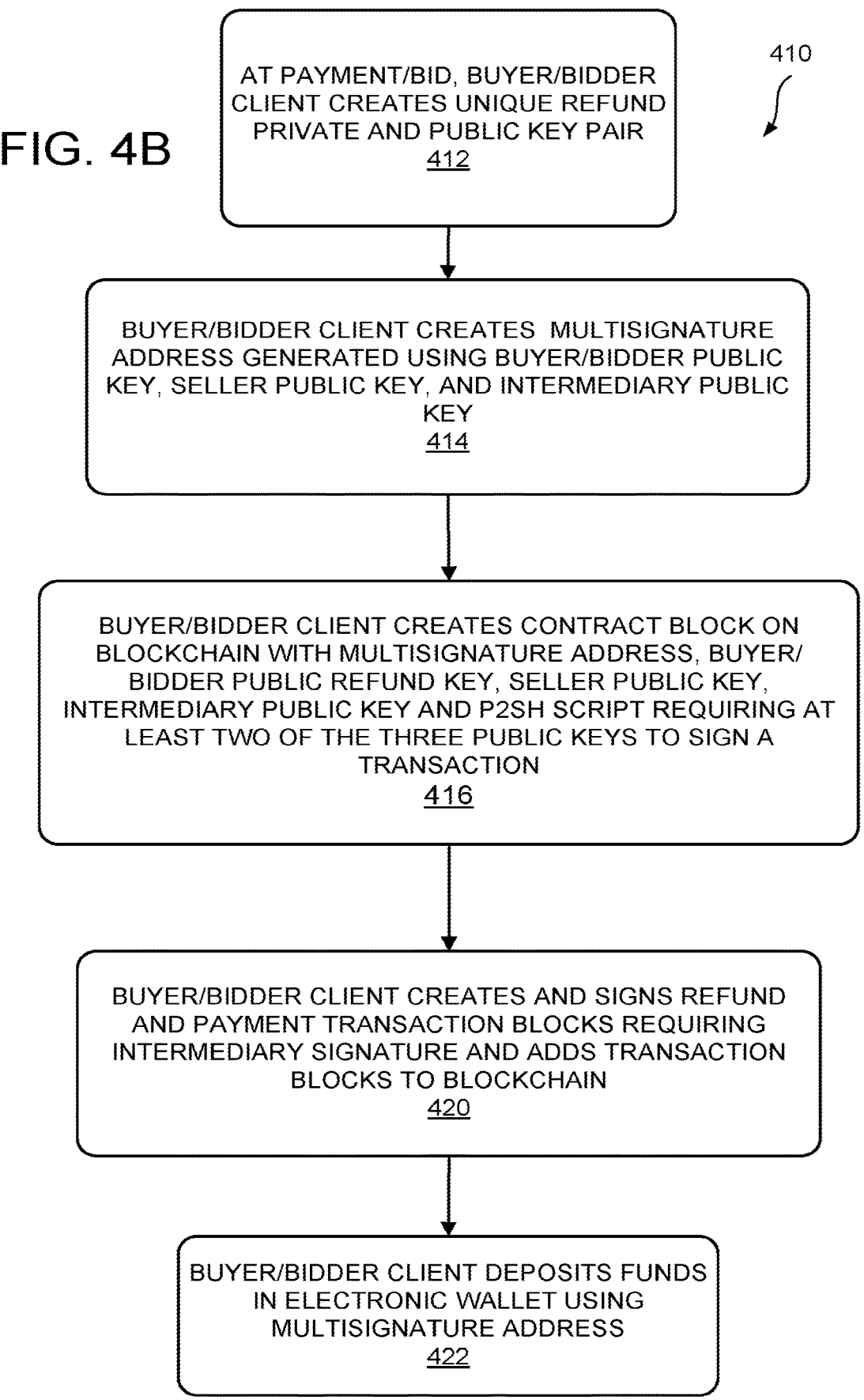
FIG. 4B is a control flow diagram illustrating an example of a process for establishing a smart contract on the transaction data blockchain that includes transaction data blocks with multiple signatures for refund or payment of funds from the transaction data blockchain.

FIG. 4B is a control flow diagram illustrating a particular example of a process 410 for establishing a smart contract on the transaction data blockchain that includes transaction data blocks with multisignature addresses based on a buyer/bidder public key, a seller public key and an intermediary public key. The multisignatures are utilized for refund or payment of funds from the transaction data blockchain.

At 412, a buyer/bidder client, such as bidder client 120B in FIG. 3A, creates a unique refund private and public key pair for use in a transaction. At 414, the buyer/bidder client 120B creates a multisignature address that is generated using the buyer/bidder's public key, the seller's public key, and the intermediary's public key.

At 416, the buyer/bidder client 120B creates a contract block, e.g. contract block 322 in FIG. 3A, on a blockchain with the multisignature address and including the buyer/bidder's public refund or send-to key, the seller's public key, the intermediary's public key and, in this example, a script that requires at least two of the three public keys to sign a transaction, such as a Pay to Script Hash (P2SH) on the BITCOIN blockchain platform or an EtherScript transfer on the ETHERIUM blockchain platform that is capable of transferring funds to an entity's public address.

At 420, buyer/bidder client 120B creates a refund and payment transaction blocks, such as refund block 324 and payment block 326 in FIG. 3A, that require the intermediary's signature in order to execute a transfer of funds and links the refund and payment transaction blocks to the contract block 322 on the blockchain. At 422, buyer/bidder client deposits funds, e.g. commits cryptocurrency, in an electronic wallet using the multisignature address of the contract block 322.

Once the buyer/bidder client deposits funds to the contract block 322, the funds are substantially held in escrow because the release of the funds, either a refund or a payment, is under the control of at least one other party apart from the buyer/bidder. Depending on the implementation, to refund the funds to the buyer/bidder requires either or both the seller's signature and the intermediary's signature. To pay the funds to the seller requires either or both the buyer's signature and the intermediary's signature.

Figure 4C:
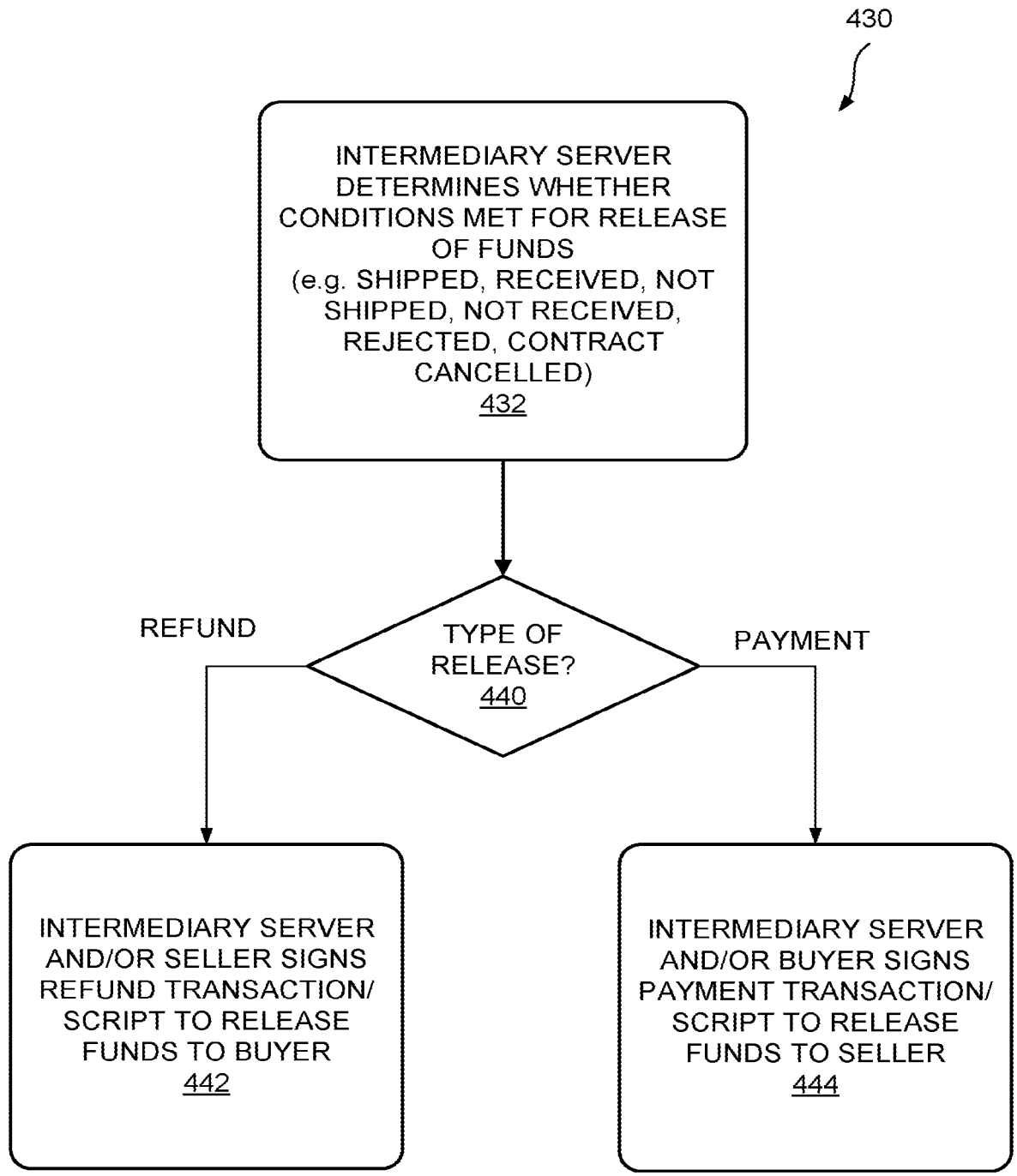
FIG. 4C is a control flow diagram showing an illustrative example of a process in an intermediary server for releasing funds secured on the transaction data blockchain in the example of FIGS. 4A and 4B.

FIG. 4C is a control flow diagram showing an illustrative example of a process 420 in which an intermediary, such as intermediary server 110 of FIG. 3A, determines whether conditions are met for releasing funds secured on the transaction data blockchain in the example of FIGS. 4A and 4B. At 432, the intermediary makes the determination based on, for example, whether the subject of the transaction, e.g. item or service, has been shipped or delivered, received, not shipped or delivered, rejected, or the contract cancelled. The determination by the intermediary can rely on input signals from either or both the bidder/buyer and the seller. The intermediary also determines that nature of the release of funds under the contract, i.e. refund to the buyer/bidder or payment to the seller.

At 440, if the determination is a refund transaction, then control transfers to 442, where the intermediary and/or the seller signs the refund transaction block to release the funds committed to the transaction back to the buyer/bidder. Note that, depending upon the implementation, the refund block can be configured to execute the refund, e.g. execute a transfer script transferring the funds to the buyer/bidder's public send-to address, based on the signature of only the intermediary, only the seller, or both the intermediary and the seller.

If the determination is a payment transaction, then, at 440, control transfers to 444, where the intermediary and/or the buyer signs the payment transaction block to release the funds committed to the transaction back to the seller. Note that, depending upon the implementation, the payment block can be configured to execute the payment, e.g. execute a transfer script transferring the funds to the seller's public send-to address, based on the signature of only the intermediary, only the buyer, or both the intermediary and the buyer.

Figure 4D:
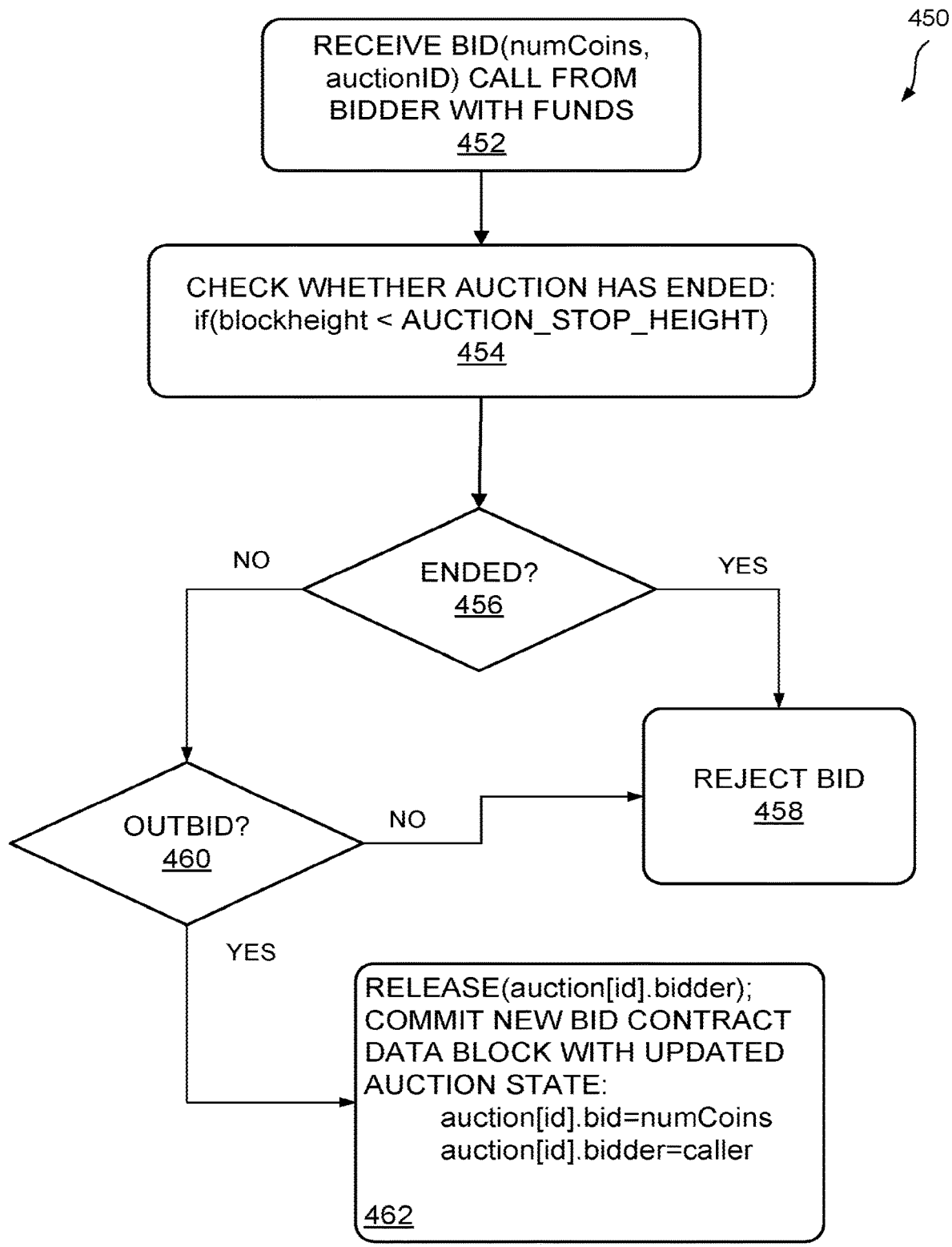
FIG. 4D is a control flow diagram showing an illustrative example of a process for processing an auction bid and securing the new bid on a transaction data blockchain.

FIG. 4D is a control flow diagram showing an illustrative example of a process 450 for processing an auction bid and securing a new bid on a transaction data blockchain, where the funds previously committed to the transaction for a superseded bid are released back to the bidder, as illustrated in the example FIG. 3B. The different operations of process 450 can be executed by intermediary server 110 of FIG. 3B or by a blockchain platform that supports the auction blockchain.

At 452, a bid is received from a bidder, such as bidder client 120C of FIG. 3B, for an auction that identifies the auction by auctionID and an amount of funds, e.g. num-Coins. At 454, a check is performed to determine whether the auction has ended. In this example, the end of the auction is determined based on whether the current blockheight of the blockchain has exceeded a previously determined end block height for the auction, e.g. AUCTION_STOP_HEIGHT. If the auction has ended, then control branches at 456 to 458 and the bid is rejected.

If the auction has not yet ended, then control branches at 456 to 460 to determine whether the new bid exceeds the current high bid, e.g. is numCoins>auction[id].bid. If the bid received at 452 is not greater than the current high bid, then control branches to 458 and the bid is rejected. If the received bid is greater than the current high bid, then control branches to 462 where funds for the superseded bid are released back to the bidder of superseded bid, e.g. Release (auction[id].bid, auction[id].bidder), and the new bid is established as the current high bid, e.g. auction[id].bid=numCoins and auction[id].bidder-caller.

The bid approach of FIGS. 3B and 4D enables bid funds to be committed to an auction blockchain and held in escrow to fulfill the bid. However, if a bid is outbid, then the bid approach enables the funds escrowed for the superseded bid to be released back to the superseded bidder. When the auction ends, the funds committed to the auction blockchain for the winning bid can be released to the seller for the auction.

Figure 4E:
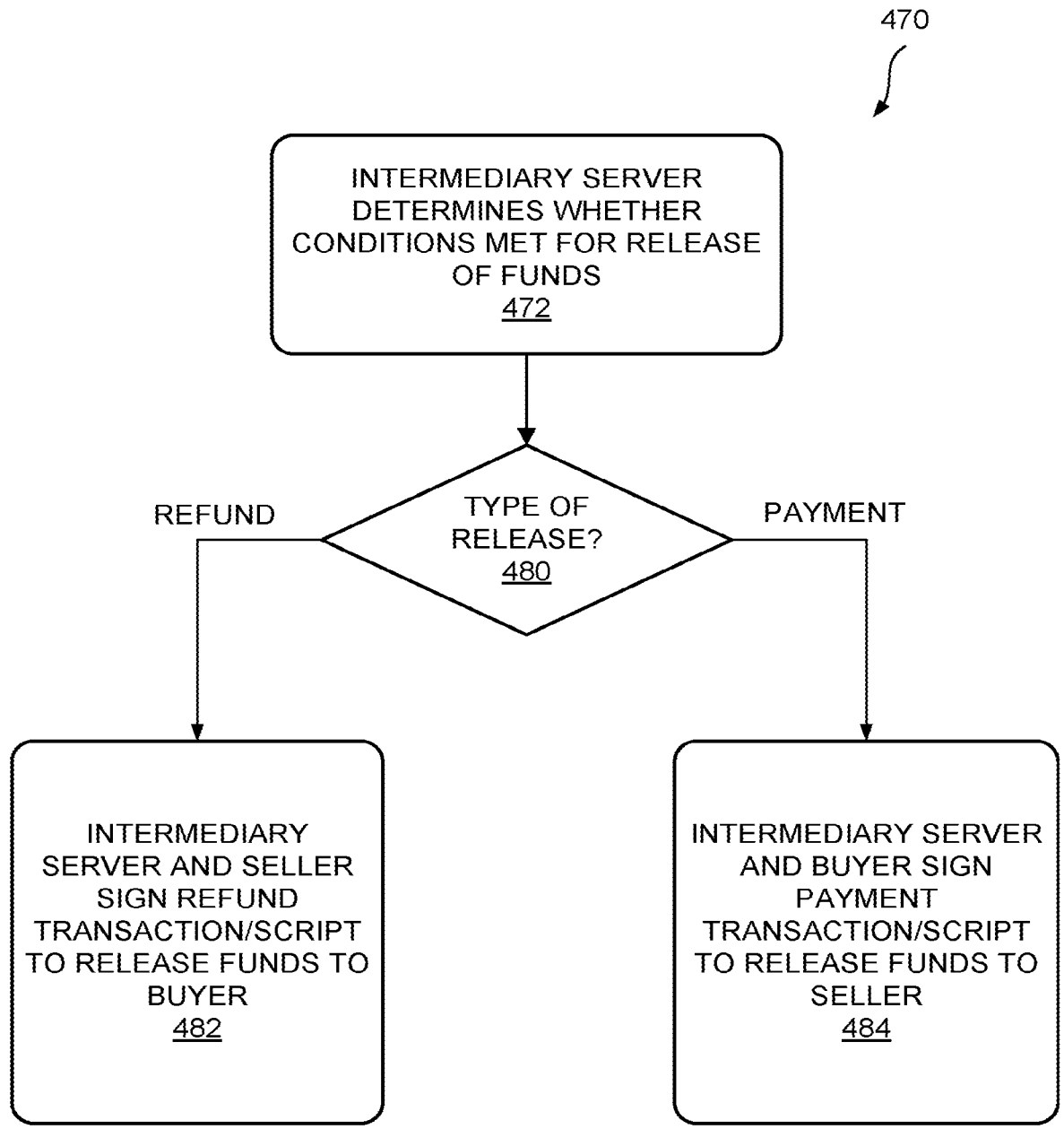
FIG. 4E is a control flow diagram showing an illustrative example of a process for releasing funds secured on the transaction data blockchain in the example of FIG. 4B.

FIG. 4E is a control flow diagram showing an illustrative example of a process 470 for releasing funds secured on the transaction data blockchain in the example of FIG. 4B using a multisignature address. In the example of FIG. 4B, the contract block for the transaction includes a P2SH script that requires at least two of the three public keys of the buyer, the seller, and the intermediary to order to transfer funds.

At 472, intermediary server 472 determines whether the conditions have been met for release of funds and the type of release. The determination can be based on input from the buyer or seller or both. If it is determined that the funds committed to the transaction or bid are to be refunded to the buyer or bidder, then control branches at 480 to 482, where the intermediary server and the seller sign the refund transaction to execute the transfer script, e.g. P2SH script signed by the intermediary and the seller, that transfers the funds to the buyer or bidder. If the release is a payment, then control transfers at 480 to 484, where the intermediary server and the buyer sign the payment transaction to execute the transfer script, e.g. P2SH script signed by the intermediary and the buyer, that transfers the funds to the seller. In this multisignature example, signatures from two out of three of the buyer, seller and intermediary are required for release of the funds.

In the approaches illustrated above, both the transaction information, e.g. the buyer, seller and price, as well as the code for the escrow of the auction can be securely stored and maintained on a blockchain, such as transaction blockchain 140 of FIG. 1, transaction data blockchain 200 of FIG. 2, the auction transaction data blockchain 250 of FIG. 2C, or the auction transaction blockchain 350 of FIG. 3B. Further, the transaction or auction information can be made fully or partially accessible for viewing in order to provide transparency to the information. In addition, the blockchains can be maintained on a distributed blockchain platform, which can eliminate the vulnerability posed by a system with a single point of attack, e.g. a single central copy of the information.

Access to the content of the transaction or auction data blockchains can be handled in a variety of ways. For maximum transparency, the blockchains may be initiated on a public blockchain with the data being available to any person who can access the blockchain. Or the blockchains can be configured to encrypt the data and restrict access so that the data is tightly controlled, e.g. only the intermediary and the seller can view the information stored on the blockchain.

Depending upon the scripting capabilities of the blockchain platform, the data blocks of the blockchains may include more extensive code execution. It should be appreciated that the utilization of blockchain technology, such as scripting technology within smart contracts, in this context provides a high degree of flexibility and variation in the configuration of implementations without departing from the teachings of the present disclosure.

Figure 5:
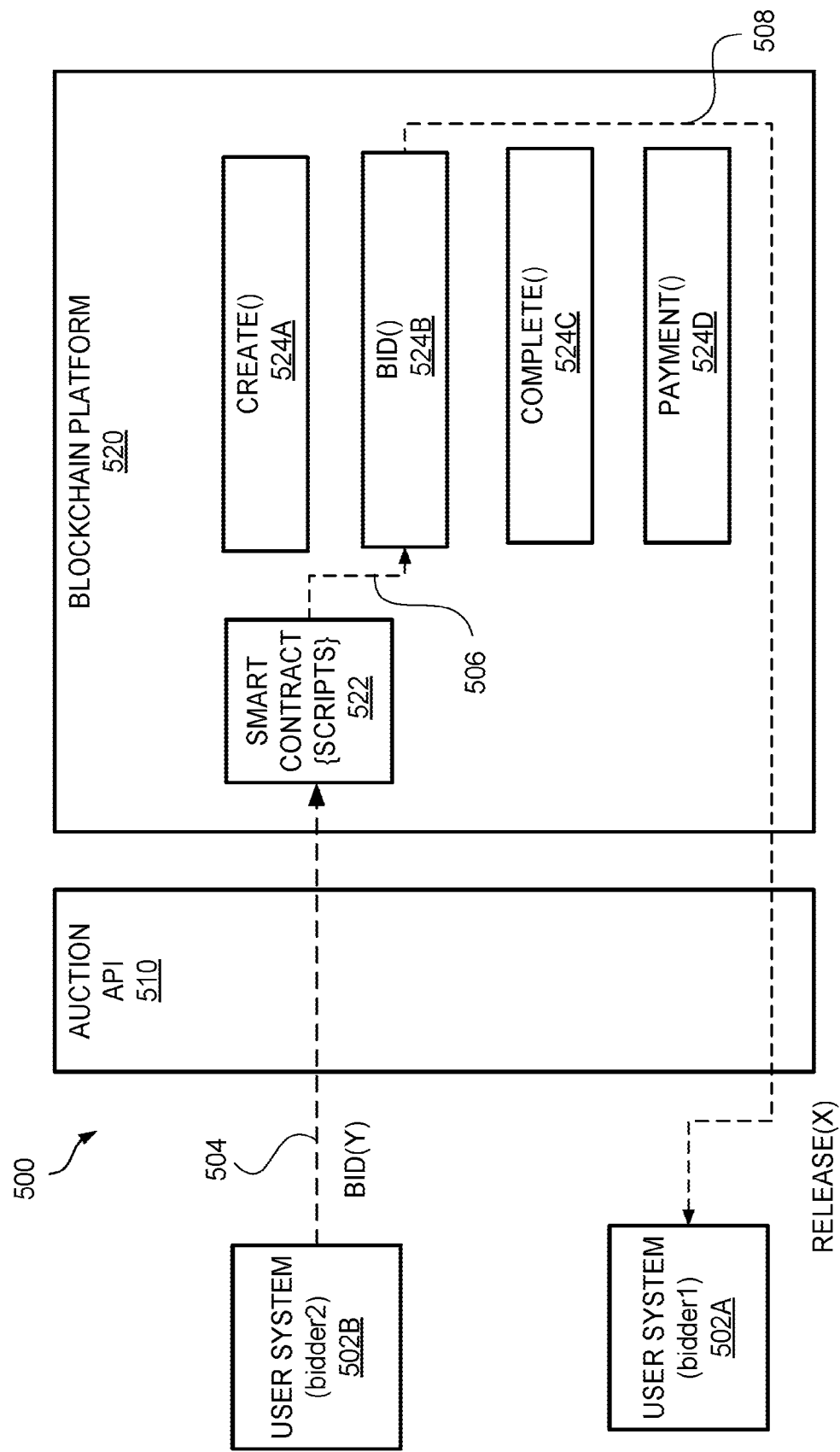
FIG. 5 is a data architecture diagram showing an illustrative example of an application programming interface to the transaction data blockchain.

FIG. 5 is a data architecture diagram showing an illustrative example of a user accessing information from the auction transaction data blockchain 350. In this example, a transaction Application Program Interface (API) 510 provides an interface to the blockchain platform 520 that supports the transaction data blockchain. The blockchain platform 520 supports smart contract 522, which includes scripts 524 with code that, when executed by the blockchain platform 520, performs operations with respect to the transaction data blockchain.

In the example of FIG. 5, four scripts are defined in smart contract 522. The CREATE script 524A provides the capability for an intermediary to create an auction on a blockchain. The BID script 524B provides the capability for a user to submit a bid to an auction transaction data blockchain, such as auction transaction data blockchain 350 of FIG. 3B. The COMPLETE script 524C provides the capability for an intermediary to end an auction and declare a winning bidder based on the auction data on the auction transaction data blockchain 350. And the PAYMENT script 524D provides the capability for payment of funds from the auction transaction data blockchain 350 to a seller. The scripts 524 shown are merely examples and many other different or additional scripts can be defined using the capability of the executable scripts in smart contract 522 as provided for on blockchain platform 520.

FIG. 5 shows a user system 502 submitting a bid BID(Y) 504 to API 510, where BID(Y) supersedes a previous bid BID(X). API 510 invokes smart contract 522 causing blockchain platform 520 to execute the BID script 524B to submit BID(Y) to the auction transaction data blockchain 350. Because BID(Y) supersedes BID(X), the funds committed to auction transaction data blockchain 350 by a first bidder for BID(X) are released back to the first bidder, e.g. RELEASE(X) at 508.

Blockchain Ledger Data Structure

Figure 6A:
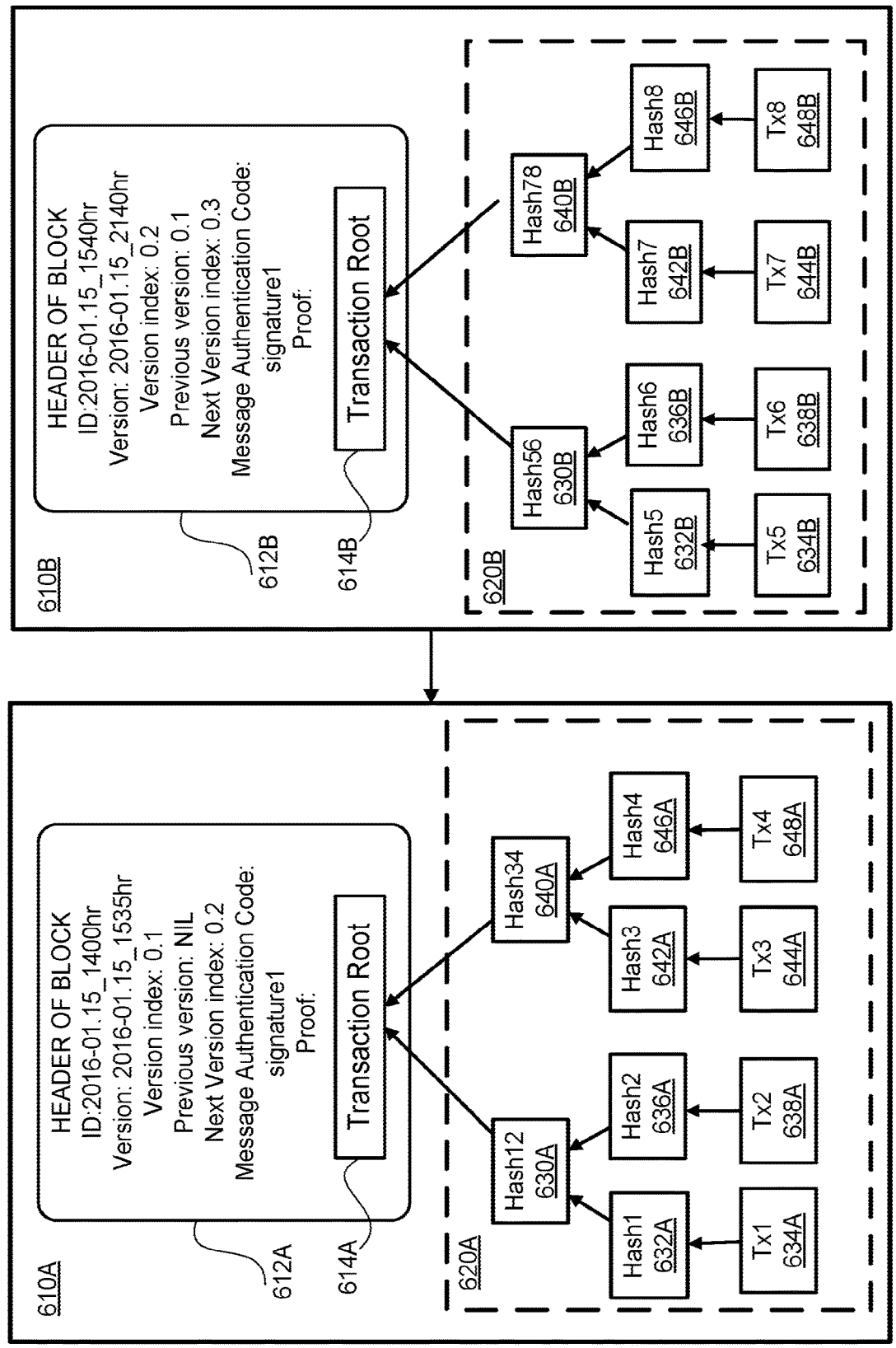
FIG. 6A is a data architecture diagram illustrating a simplified example of a blockchain ledger based on the blocks of the transaction data blockchain of FIG. 1.

FIG. 6A is a data architecture diagram illustrating a simplified example of a blockchain ledger 600 based on the blocks 210A-E of FIG. 2A, which can be related to blocks 142A-E of the transaction data blockchain ledger 140 of FIG. 1 or the blocks 352A-E of the auction transaction data blockchain 350 of FIG. 3B. The blockchain ledger 600 example of FIG. 6A is simplified to show block headers, metadata and signatures of blocks 210A-E in order to demonstrate a transaction data ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
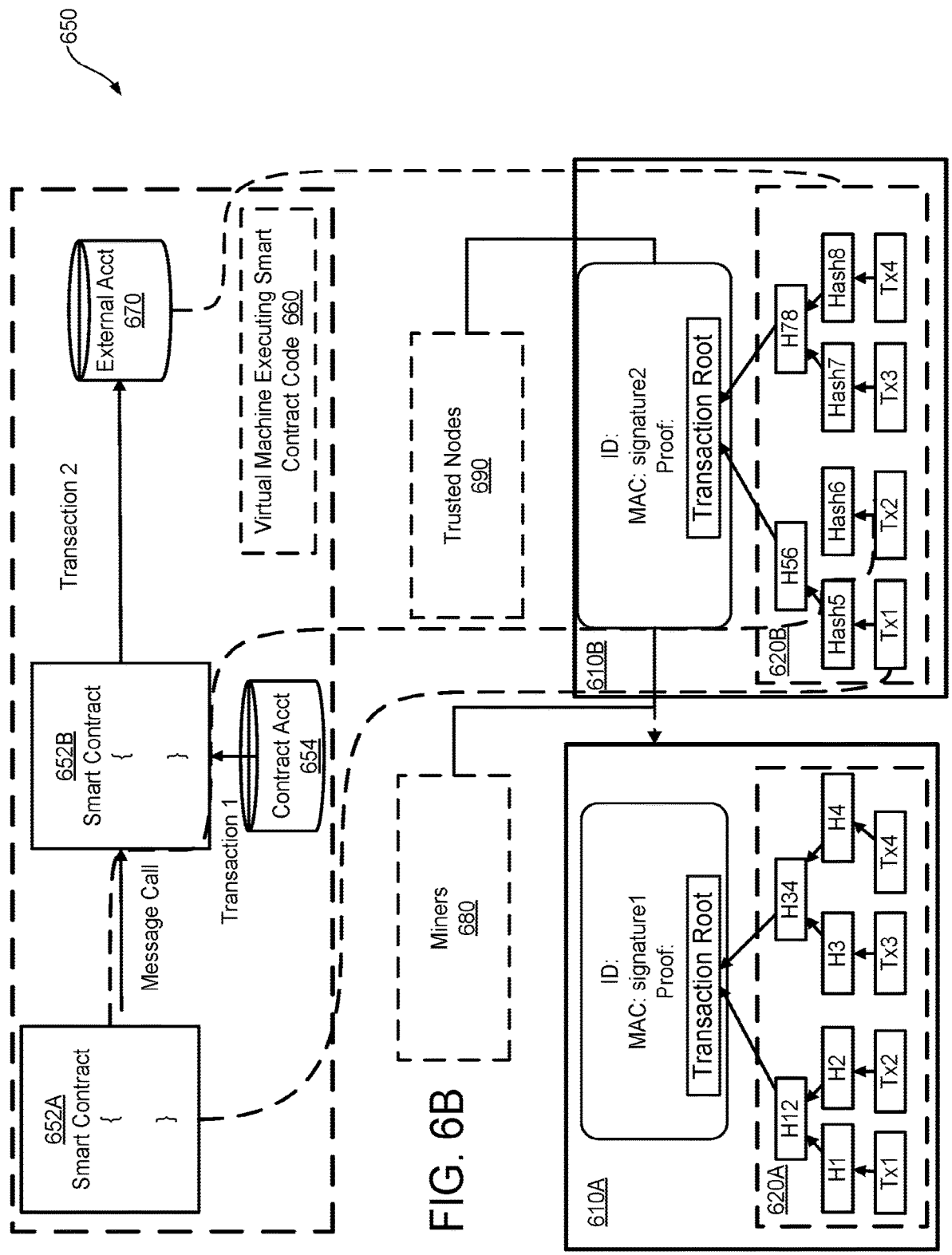
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 652 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 652 are executed in a virtual machine environment, although this is optional.

In FIG. 6B, the aspects of smart contracts 652 are stored in transaction data nodes in data tree 620 in the blocks 610 of the blockchain ledger of FIG. 6A. In the example of FIG. 6B, Smart Contract 652A is stored in data block Tx1 node 634A of data tree 620A in block 610A, Smart Contract 652B is stored in Tx2 node 638A, Contract Account 654 associated with Smart Contract 652B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process is determined by a centralized control of a cluster of trusted nodes. In this case, the centralized control may be a trusted node, such as intermediary server 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a transaction data block 142 for transaction data blockchain 140 or an auction transaction data block 352 for auction transaction data blockchain 350, the block is an unconfirmed and unidentified entity. To be part of the acknowledged "currency", it may be added to the blockchain, and therefore relates to the concept of a trusted cluster.

In a trusted cluster, when a transaction data block 142 or auction transaction data block 352 is added, every node competes to acknowledge the next "transaction" (e.g. a change to the transaction data list or another bid transaction). In one example, the nodes compete to mine and get the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to transactions or bid data, may also be ciphered for restricted access so that the meta-data does not disclose information pertaining to the transaction data or the auction transaction data.

Figure 4F:
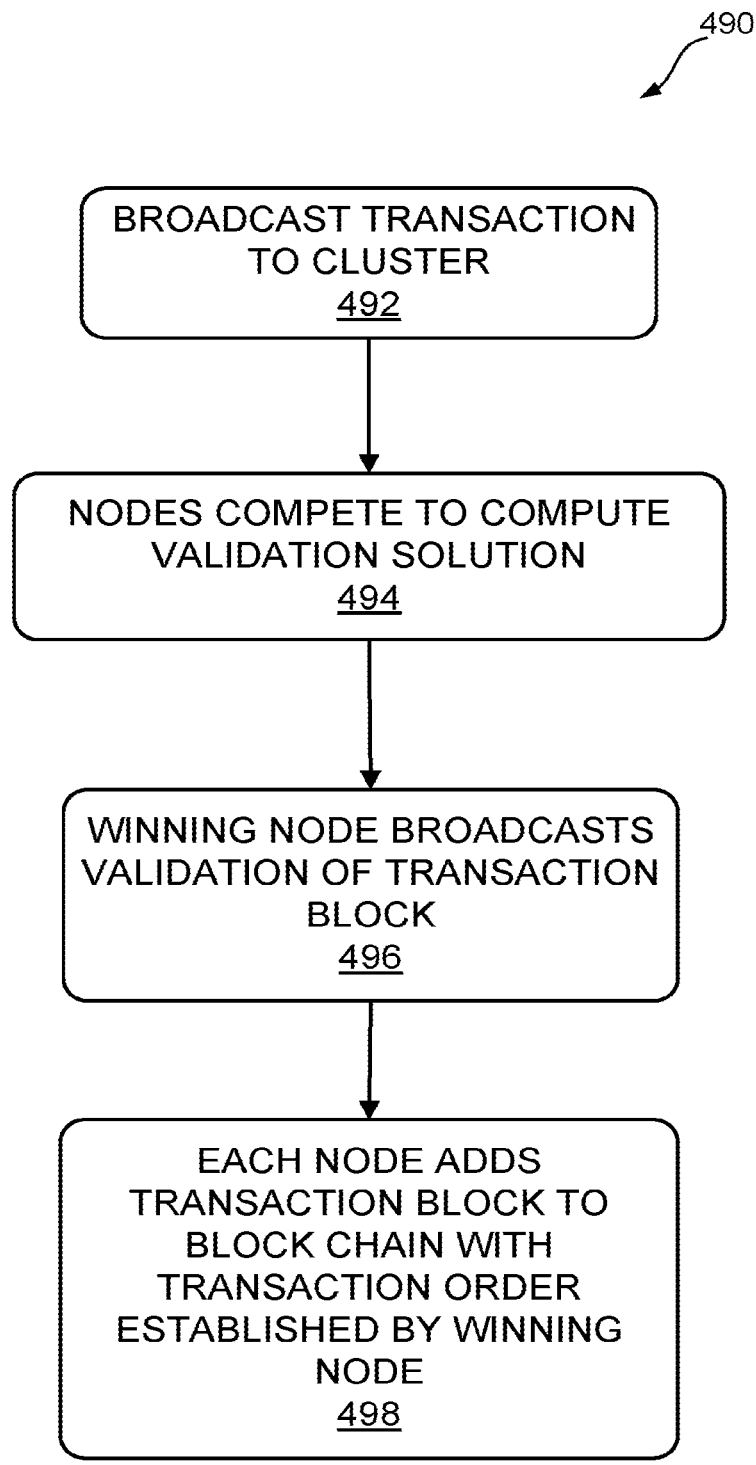
FIG. 4F is a control flow diagram illustrating an example of a validation process for blocks added to the transaction data blockchain distributed to untrusted nodes.

The mining process, such as may be used in concert with the validation process 490 of FIG. 4F, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast to the network, at 492, using software. Mining nodes compete, at 494, to compute a validation solution to validate transactions, and then broadcast, at 496, the completed block validation to other nodes. Each node adds the block, at 498, to its copy of the blockchain with transaction order established by the winning node.

Note that in a restricted network, stake-holders who are authorized to check or mine for the transaction data or the auction transaction data may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the transaction data or the auction transaction data blockchain ledgers may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the transaction data or the auction transaction data as centrally authorized and kept offline.

In some examples, access to a transaction data blockchain or an auction transaction data blockchain ledger may be restricted by cryptographic means to be only open to authorized servers. Since the blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approaches involving controlling a transaction or an auction on a blockchain. The specific examples of different aspects of controlling a transaction or an auction on a blockchain described herein are illustrative and are not intended to limit the scope of the techniques shown.

Smart Contracts

Smart contracts are defined by code. As described previously, the terms and conditions of the smart contract may be encoded (e.g., by hash) into a block-chain ledger. Specifically, smart contracts may be compiled into a bytecode (if executed in a virtual machine), and then the bytecode may be stored in a block-chain ledger as described previously. Similarly, transaction data executed and generated by smart contracts may be stored in the block-chain ledger in the ways previously described.

Computer Architectures for Use of Smart Contracts and Blockchain Ledgers

Figure 8:
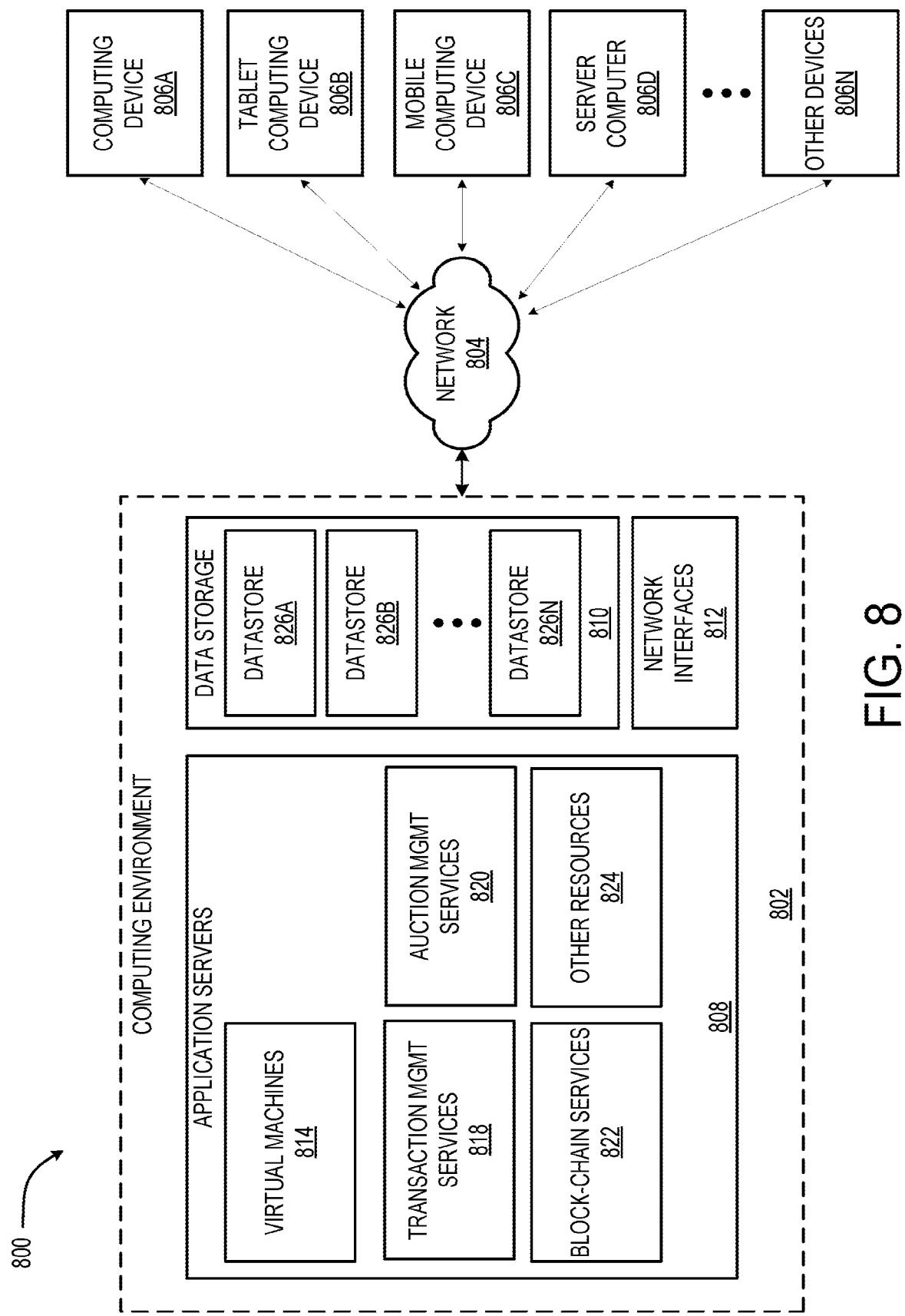
FIG. 8 is a diagram illustrating a distributed computing environment capable of implementing aspects of the techniques and technologies presented herein.

Note that at least parts of processes 400, 410, 430, 450 and 470 of FIGS. 4A, 4B, 4C, 4D and 4E, the scripts of transaction data block 386 of FIG. 3C, smart contract 522 of FIG. 5, smart contracts 652 of FIG. 6B, and other processes and operations pertaining to the transaction data or the auction transaction data blockchain ledgers described herein may be implemented in one or more servers, such as computer environment 800 in FIG. 8, or the cloud, and data defining the results of user control input signals translated or interpreted as discussed herein may be communicated to a user device for display. Alternatively, some or all of the transaction data or the auction transaction data blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 410, 430, 450 and 470 of FIGS. 4A, 4B, 4C, 4D, 4E and 4F, the scripts of transaction data block 386 of FIG. 3C, smart contract 522 of FIG. 5, smart contracts 652 of FIG. 6B) are described herein as being implemented, at least in part, by an application, component, and/or circuit. Although the following illustration refers to the components of FIGS. 3C, 4A, 4B, 4C, 4D, 4E, 4F, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 410, 430, 450 and 470 of FIGS. 4A, 4B, 4C, 4D, 4E and 4F, the scripts of transaction data block 386 of FIG. 3C, smart contract 522 of FIG. 5, smart contracts 652 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
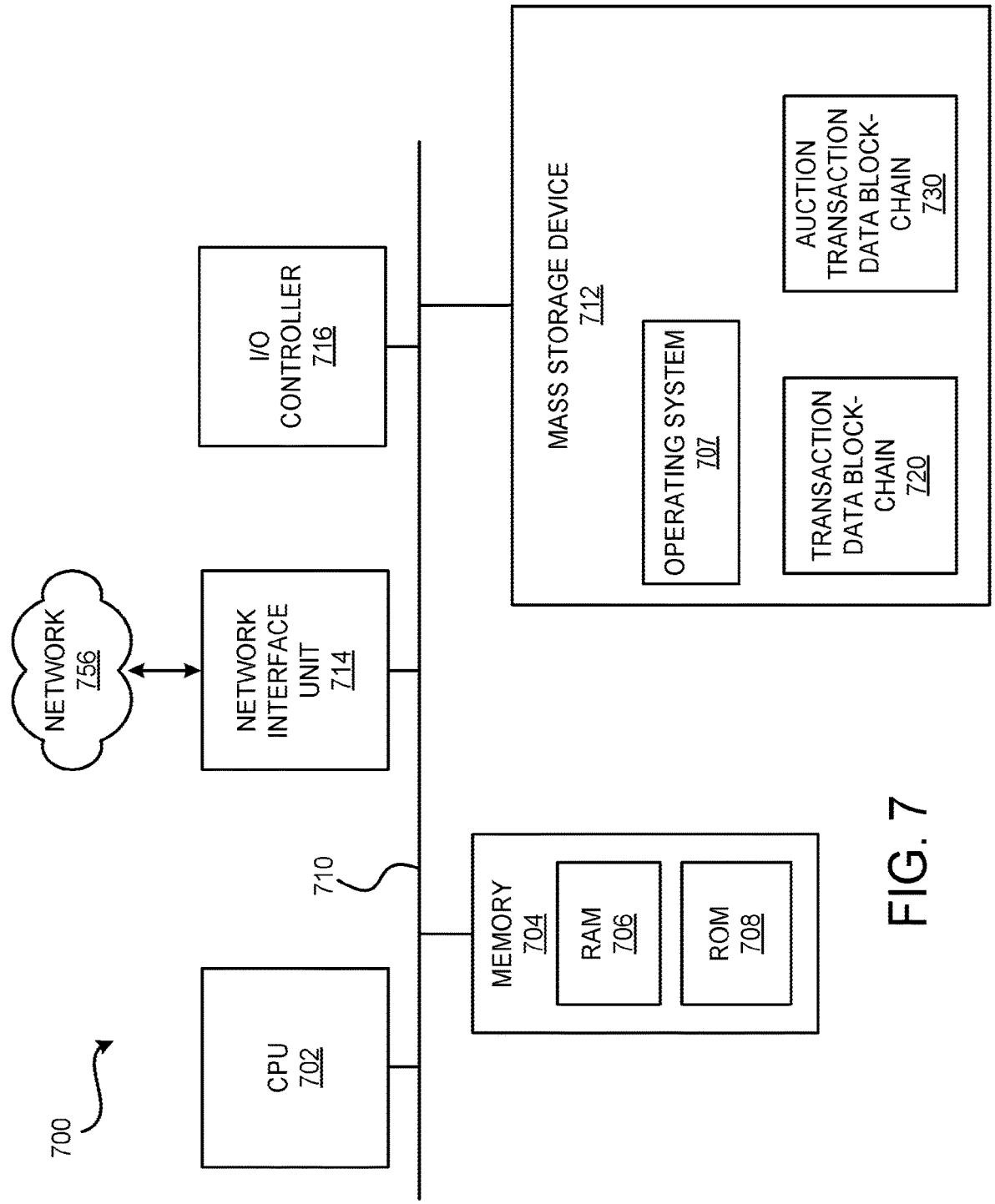
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the intermediary server 110 and client/servers 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of transaction data blockchain data 720 or auction transaction blockchain data 730), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a transaction data blockchain or an auction transaction data blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 756, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for transaction data and auction transaction data blockchain ledgers. It should be understood that this configuration is illustrative only and should not be construed as being limiting in any way.

According to various implementations, the application servers 808 also include one or more transaction management services 818, auction data management services 820, and one or more blockchain services 822. The transaction data management services 818 can include services for managing a transaction data list on a transaction data blockchain, such as transaction data blockchain 140 in FIG. 1. The auction data management services 820 can include services for managing auction data on an auction transaction data blockchain, such as auction transaction data blockchain 350 in FIG. 3B. The blockchain services 822 can include services for participating in management of one or more blockchains, such as by creating genesis blocks, transaction blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a transaction data blockchain or an auction transaction data blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting transaction data and auction transaction data blockchain ledgers, among other aspects.

Figure 9:
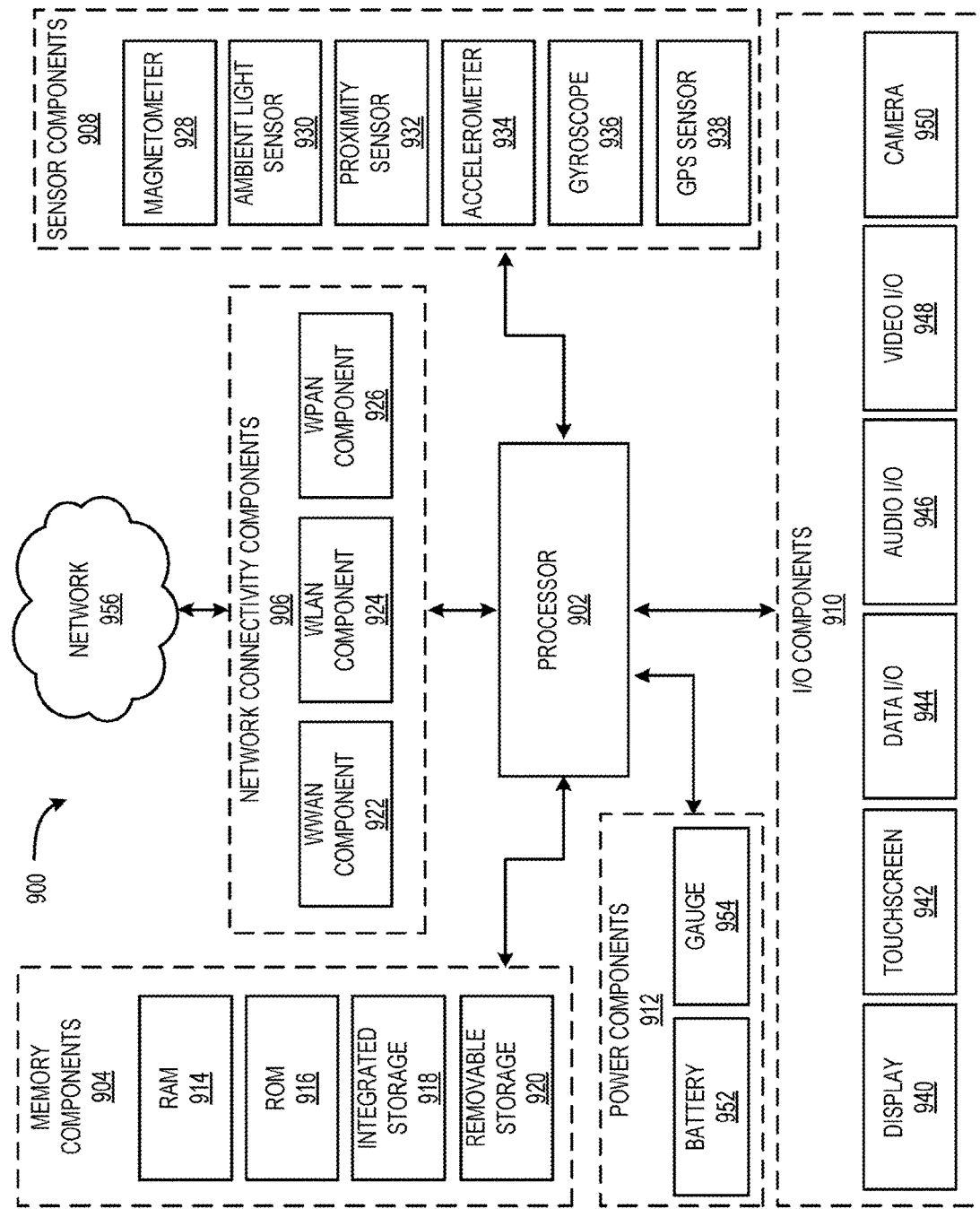
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for transaction data and auction transaction data blockchain ledgers. The computing device architecture 900 is applicable to computing devices that can manage transaction data and auction transaction data blockchain ledgers. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the servers 110 and 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented method for controlling transactions, where the method includes: in response to receiving a first transaction, creating a first contract block on a blockchain, the first contract block storing an identifier of a seller entity, an identifier of a first buyer entity, and an identifier of an intermediary entity; storing funds data to the blockchain, the funds data indicating funds are committed to the first transaction by the first buyer entity; creating a refund code authorized by a first refund transaction block, the refund code configured to refund the committed funds for the first transaction when a seller digital signature or an intermediary digital signature are received; linking the first refund transaction block to the first contract block; creating a payment code authorized by a first payment transaction block, the payment code configured to transfer the committed funds for the first transaction to an account of the seller entity when a first buyer entity digital signature or the intermediary entity digital signature are received; and linking the first payment transaction block to the first contract block.

Clause 2: The computer-implemented method of Clause 1, further comprising verifying that either the seller digital signature or the intermediary digital signature is partially based on data within the first refund transaction block before the refund of the committed funds.

Clause 3: The computer-implemented method of Clause 1, further comprising verifying that either the first buyer digital signature or the intermediary digital signature is partially based on data within the first payment transaction block before the transfer of the committed funds.

Clause 4: The computer-implemented method of Clause 1, where the identifier of the buyer entity is a public key.

Clause 5: The computer-implemented method of Clause 1, where: the identifier of the seller entity is a public key.

Clause 6: The computer-implemented method of Clause 1, where: the method includes creating a multisignature address using a public key for the first buyer entity, a public key for the seller entity, and a public key for the intermediary entity; creating a first contract block on a blockchain for a transaction comprises creating the first contract block on the blockchain with the multisignature address and a transfer script that requires at least two of the public key for the first buyer entity, the public key for the seller entity, and the public key for the intermediary entity to transfer the committed funds for the first transaction; creating a first refund transaction block configured to refund the committed funds for the first transaction to the first buyer entity includes signing the first refund transaction block by the first buyer entity such that the first refund transaction block is configured to transfer the committed funds for the first transaction to the first buyer entity when data in the first refund transaction block is signed by the intermediary entity; and creating a first payment transaction block configured to transfer the committed funds for the first transaction to the seller entity includes signing the first payment transaction block by the first buyer entity such that the first payment transaction block is configured to transfer the committed funds for the first transaction to the seller entity when data in the first payment transaction block is signed by the intermediary entity.

Clause 7: The computer-implemented method of Clause 1, where the method further includes: in response to receiving a second transaction, creating a second contract block on the blockchain, the second contract block storing the identifier of the seller entity, an identifier of a second buyer entity and the identifier of the intermediary entity; storing funds data for the second transaction to the blockchain, the funds data indicating funds are committed to the second transaction by the first buyer entity; creating a second refund transaction block configured to refund the committed funds for the second transaction to the second buyer entity when data of the second refund transaction block is signed by at least one of the seller entity and the intermediary entity and linking the second refund transaction block to the second contract block; creating a second payment transaction block configured to transfer the committed funds for the second transaction to the seller entity when data of the second payment transaction block is signed by at least one of the second buyer entity and the intermediary entity and linking the second payment transaction block to the second contract block; and refunding the committed funds for the first transaction to the first buyer entity by signing the first refund transaction block by at least one of the seller entity and the intermediary entity.

Clause 8: A computer-implemented method for controlling auction transactions on a blockchain, the method comprising: in response to receiving a first bid transaction, creating a first auction transaction data block on a blockchain for the first bid transaction, the first bid transaction block storing an identifier of a seller entity, an identifier of a first bidder entity and an identifier of an intermediary entity; storing first funds data to the blockchain, the first funds data indicating funds are committed to the first bid transaction by the first bidder entity; creating a first refund code authorized by a first refund transaction block, the first refund code configured to refund the committed funds for the first bid transaction to the identifier of the first bidder entity when a seller digital signature or an intermediary digital signature are received; linking the first refund transaction block to the first auction transaction data block; and creating a first payment code authorized by a first payment transaction block, the first payment code configured to transfer the committed funds for the first bid transaction to an account for the seller entity when a first bidder entity digital signature or the intermediary entity digital signature are received; and linking the first payment transaction block to the first auction transaction data block.

Clause 9: The computer-implemented method of Clause 8, where the method includes: in response to receiving a second bid transaction, creating a second auction transaction data block on the blockchain, the second bid transaction block storing the identifier of the seller entity, an identifier of a second bidder entity and the identifier of the intermediary entity; storing second funds data to the blockchain, the second funds data indicating funds are committed to the second bid transaction by the second bidder entity; creating a second refund code authorized by a second refund transaction block, the second refund code configured to refund the committed funds for the second transaction to the identifier of the second bidder entity when the seller digital signature or the intermediary digital signature are received; linking the second refund transaction block to the second auction transaction data block; creating a second payment code authorized by a second payment transaction block, the second payment code configured to transfer the committed funds for the second transaction to the account of the seller entity when a second bidder entity digital signature or the intermediary entity digital signature are received; linking the second payment transaction block to the second auction transaction data block; and refunding the committed funds for the first transaction to the identifier of the first bidder entity by the intermediary digitally signing the first refund transaction block.

Clause 10: The computer-implemented method of Clause 9, where step of refunding the committed funds for the first transaction to identifier of the first bidder entity is performed automatically responsive to receiving the second bid transaction.

Clause 11: The computer-implemented method of Clause 9, where the method includes at least one of the steps of: verifying that either the seller digital signature or the intermediary digital signature is partially based on data within the first refund transaction block before the refund of the committed funds for the first bid transaction to the first buyer entity; verifying that either the seller digital signature or the intermediary digital signature is partially based on data within the second refund transaction block before the refund of the committed funds for the second bid transaction to the second buyer entity; verifying that either the first buyer digital signature or the intermediary digital signature is partially based on data within the first payment transaction block before transferring the committed funds for the first bid transaction to the seller entity; and verifying that either the second buyer digital signature or the intermediary digital signature is partially based on data within the second payment transaction block before transferring the committed funds for the second bid transaction to the seller entity.

Clause 12: The computer-implemented method of Clause 11, where at least one of: the identifier of the first bidder entity comprises a public key for the first bidder entity; the identifier of the second bidder entity comprises a public key for the second bidder entity; the identifier of the seller entity comprises a public key for the seller entity; and the identifier of the intermediary entity comprises a public key for the intermediary entity.

Clause 13: The computer-implemented method of Clause 8, the method including: creating a genesis auction contract data block by the intermediary, the genesis auction contract data block storing the identifier of the seller entity and the identifier of the intermediary entity; the step of creating a first auction transaction data block on a blockchain for a first bid transaction includes linking the first auction transaction data block to the genesis auction contract data block; and the genesis auction contract data block includes code that, when executed by a blockchain platform, perform methods for one or more of the steps of creating a first auction transaction data block on a blockchain for a first bid transaction, creating a first refund transaction block configured to refund the committed funds for the first bid transaction to the first buyer entity, and creating a first payment transaction block configured to transfer the committed funds for the first transaction to the seller entity.

Clause 14: The computer-implemented method of Clause 8, the method including: determining when the auction has ended and identifying a winning bidder; paying funds committed by the winning bidder to the seller entity by signing by at least one of the winning bidder and the intermediary entity a payment transaction block configured to transfer the funds committed by the winning bidder to the seller entity.

Clause 15: Computer storage media having computer executable instructions stored thereon which, when executed by one or more processors, cause the processors to execute a computer-implemented method for controlling transactions, the method comprising: in response to receiving a first transaction, creating a first contract block on a blockchain, the first contract block storing an identifier of a seller entity, an identifier of a first buyer entity, and an identifier of an intermediary entity; storing funds data to the blockchain, the funds data indicating funds are committed to the first transaction by the first buyer entity; creating a refund code authorized by a first refund transaction block, the refund code configured to refund the committed funds for the first transaction when a seller digital signature or an intermediary digital signature are received; linking the first refund transaction block to the first contract block; creating a payment code authorized by a first payment transaction block, the payment code configured to transfer the committed funds for the first transaction to an account of the seller entity when a first buyer entity digital signature or the intermediary entity digital signature are received; and linking the first payment transaction block to the first contract block.

Clause 16: The computer storage media of Clause 15, the method further comprising at least one of: verifying that either the seller digital signature or the intermediary digital signature is partially based on data within the first refund transaction block before the refund of the committed funds; and verifying that either the first buyer digital signature or the intermediary digital signature is partially based on data within the first payment transaction block before the transfer of the committed funds.

Clause 17: The computer storage media of Clause 15, where at least one of: the identifier of the first buyer entity is a public key for the first buyer entity; the identifier of the seller entity is a public key for the seller entity; and the identifier of the intermediary entity is a public key for the intermediary entity.

Clause 18. The computer storage media of Clause 15, where the method includes: transferring the committed funds for the first transaction to the seller entity by signing data in the first payment transaction block by at least one of the first buyer entity and the intermediary entity.

Clause 19: The computer storage media of Clause 15, where: the method includes creating a multisignature address using a public key for the first buyer entity, a public key for the seller entity, and a public key for the intermediary entity; creating a first contract block on a blockchain for a transaction comprises creating the first contract block on the blockchain with the multisignature address and a transfer script that requires at least two of the public key for the first buyer entity, the public key for the seller entity, and the public key for the intermediary entity to transfer the committed funds for the first transaction; creating a first refund transaction block configured to refund the committed funds for the first transaction to the first buyer entity includes signing the first refund transaction block by the first buyer entity such that the first refund transaction block is configured to transfer the committed funds for the first transaction to the first buyer entity when data in the first refund transaction block is signed by the intermediary entity; and creating a first payment transaction block configured to transfer the committed funds for the first transaction to the seller entity includes signing the first payment transaction block by the first buyer entity such that the first payment transaction block is configured to transfer the committed funds for the first transaction to the seller entity when data in the first payment transaction block is signed by the intermediary entity.

Clause 20: The computer storage media of Clause 15, where the method further includes: creating a second contract block on the blockchain for a second transaction, the second contract block storing the identifier of the seller entity, an identifier of a second buyer entity and the identifier of the intermediary entity; committing funds for the second transaction to the blockchain by the second buyer entity; creating a second refund transaction block configured to refund the committed funds for the second transaction to the second buyer entity when data in the second refund transaction block is signed by at least one of the seller entity and the intermediary entity and linking the second refund transaction block to the second contract block; creating a second payment transaction block configured to transfer the committed funds for the second transaction to the seller entity when data in the second payment transaction block is signed by at least one of the second buyer entity and the intermediary entity and linking the second payment transaction block to the second contract block; and refunding the committed funds for the first transaction to the first buyer entity by signing data in the first refund transaction block by at least one of the seller entity and the intermediary entity.

What is claimed is:

1. A computer-implemented method executed by at least one of a plurality of nodes of a distributed ledger network, the method comprising:
   creating a first block on a blockchain of the distributed ledger network, the first block committing a transaction amount for a transaction involving a seller entity associated with a first key, a buyer entity associated with a second key, and an intermediary entity associated with a third key;
   creating, on the blockchain and cryptographically linked to the first block, a second block storing a refund code, the refund code executable by the plurality of nodes to transfer the committed transaction amount to an address controlled by the buyer entity only when a digital signature produced using the first key and/or the third key is present and no digital signature using the second key is present;
   creating, on the blockchain and cryptographically linked to the first block, a third block storing a payment code, the payment code executable by the plurality of nodes to transfer the committed transaction amount to an a address controlled by the seller entity only when a digital signature produced using the second key and/or the third key is present and no digital signature using the first key is present; and
   broadcasting the first block, the second block, and the third block to other nodes of the distributed ledger network, wherein each node validates a transaction that transfers the committed transaction amount by determining that the transaction satisfies either the refund code of the second block or the payment code of the third block.

2. The computer-implemented method of claim 1, wherein the refund code is further executable to verify the digital signature is produced using the first key and/or the third keypad least partially based on data within the second block before transfer of the committed transaction amount.

3. The computer-implemented method of claim 1, wherein the payment code is further executable to verify the digital signature is produced using the second key and/or the third keypad least partially based on data within the third block before transfer of the committed transaction amount.

4. The computer-implemented method of claim 1, wherein the method further comprises:
   creating a multisignature address using the first key for the seller entity, the second key for the buyer entity, and the third key for the intermediary entity; and
   wherein creating the first block on the blockchain comprises creating the first block on the blockchain with the multisignature address.

5. The computer-implemented method of claim 1, wherein the method further comprises:
   creating a fourth block on the blockchain, the fourth block committing a second transaction amount for a second transaction involving the seller entity, a second buyer entity associated with a fourth key, and the intermediary entity;
   creating, on the blockchain and cryptographically linked to the fourth block, a fifth block storing a second refund code, the second refund code executable by the plurality of nodes to transfer the committed second transaction amount to the second buyer entity when a digital signature produced using the first key and/or the third key is present and no digital signature using the fourth key is present;
   creating, on the blockchain and cryptographically linked to the fourth block, a sixth block storing a second payment code, the second payment code executable by the plurality of nodes to transfer the committed second transaction amount to the seller entity when a digital signature produced using the fourth key and/or the third key is present and no digital signature using the first key is present; and
   broadcasting the fourth block, the fifth block, and the sixth block to other nodes of the distributed ledger network, wherein each node validates a second transaction that transfers the committed second transaction amount by determining that the second transaction satisfies either the second refund code of the fifth block or the second payment code of the sixth block.

6. The computer-implemented method of claim 1, wherein the method further comprises:
   executing the refund code to transfer the committed transaction amount in response to receiving the digital signature produced using the first key and/or the third key.

7. The computer-implemented method of claim 1, wherein the method further comprises:

executing the payment code to transfer the committed transaction amount in response to receiving the digital signature produced using the second key and/or the third key.

8. One or more computer storage media storing computer-useable instructions that, when used by a computing device, cause the computing device to perform operations, the operations comprising:
creating a first block on a blockchain of the distributed ledger network, the first block committing a transaction amount for a transaction involving a seller entity associated with a first key, a buyer entity associated with a second key, and an intermediary entity associated with a third key;
creating, on the blockchain and cryptographically linked to the first block, a second block storing a refund code, the refund code executable by the plurality of nodes to transfer the committed transaction amount to an account of address controlled by the buyer entity only when a digital signature produced using the first key and/or the third key is present and no digital signature using the second key is present;
creating, on the blockchain and cryptographically linked to the first block, a third block storing a payment code, the payment code executable by the plurality of nodes to transfer the committed transaction amount to an a address controlled by the seller entity only when a digital signature produced using the second key and/or the third key seller is present and no digital signature using the first key is present; and
broadcasting the first block, the second block, and the third block to other nodes of the distributed ledger network, wherein each node validates a transaction that transfers the committed transaction amount by determining that the transaction satisfies either the refund code of the second block or the payment code of the third block.

9. The one or more computer storage media of claim 8, wherein the refund code is further executable to verify the digital signature is produced using the first key and/or the third keypad least partially based on data within the second block before transfer of the committed transaction amount.

10. The one or more computer storage media of claim 8, wherein the payment code is further executable to verify the digital signature is produced using the second key and/or the third keypad least partially based on data within the third block before transfer of the committed transaction amount.

11. The one or more computer storage media of claim 8, wherein the operations further comprise:
creating a multisignature address using the first key for the seller entity, the second key for the buyer entity, and the third key for the intermediary entity; and
wherein creating the first block on the blockchain comprises creating the first block on the blockchain with the multisignature address.

12. The one or more computer storage media of claim 8, wherein the operations further comprise:
creating a fourth block on the blockchain, the fourth block committing a second transaction amount for a second transaction involving the seller entity, a second buyer entity associated with a fourth key, and the intermediary entity;
creating, on the blockchain and cryptographically linked to the fourth block, a fifth block storing a second refund code, the second refund code executable by the plurality of nodes to transfer the committed second transaction amount to the second buyer entity when a digital signature produced using the first key and/or the third key is present and no digital signature using the fourth key is present;
creating, on the blockchain and cryptographically linked to the fourth block, a sixth block storing a second payment code, the second payment code executable by the plurality of nodes to transfer the committed second transaction amount to the seller entity when a digital signature produced using the fourth key and/or the third key is present and no digital signature using the first key is present; and
broadcasting the fourth block, the fifth block, and the sixth block to other nodes of the distributed ledger network, wherein each node validates a second transaction that transfers the committed second transaction amount by determining that the second transaction satisfies either the second refund code of the fifth block or the second payment code of the sixth block.

13. The one or more computer storage media of claim 8, wherein the operations further comprise:
executing the refund code to transfer the committed transaction amount in response to receiving the digital signature produced using the first key and/or the third key.

14. The one or more computer storage media of claim 8, wherein the operations further comprise:
executing the payment code to transfer the committed transaction amount in response to receiving the digital signature produced using the second key and/or the third key.

15. A computer system comprising:
a processor; and
a computer storage medium storing computer-useable instructions that, when used by the processor, causes the computer system to perform operations comprising:
creating a first block on a blockchain of the distributed ledger network, the first block committing a transaction amount for a transaction involving a seller entity associated with a first key, a buyer entity associated with a second key, and an intermediary entity associated with a third key;
creating, on the blockchain and cryptographically linked to the first block, a second block storing a refund code, the refund code executable by the plurality of nodes to transfer the committed transaction amount to an address controlled by the buyer entity only when a digital signature produced using the first key and/or the third key is present and no digital signature using the second key is present;
creating, on the blockchain and cryptographically linked to the first block, a third block storing a payment code, the payment code executable by the plurality of nodes to transfer the committed transaction amount to an a address controlled by the seller entity only when a digital signature produced using the second key and/or the third key is present and no digital signature using the first key is present; and
broadcasting the first block, the second block, and the third block to other nodes of the distributed ledger network, wherein each node validates a transaction that transfers the committed transaction amount by determining that the transaction satisfies either the refund code of the second block or the payment code of the third block.

16. The computer system of claim 15, wherein the refund code is further executable to verify the digital signature is produced using the first key and/or the third key at least partially based on data within the second block before transfer of the committed transaction amount; and wherein the payment code is further executable to verify the digital signature is produced using the second key and/or the third keypad least partially based on data within the third block before transfer of the committed transaction amount.

17. The computer system of claim 15, wherein the operations further comprise:
creating a multisignature address using the first key for the seller entity, the second key for the buyer entity, and the third key for the intermediary entity; and
wherein creating the first block on the blockchain comprises creating the first block on the blockchain with the multisignature address.

18. The computer system of claim 15, wherein the operations further comprise:
creating a fourth block on the blockchain, the fourth block committing a second transaction amount for a second transaction involving the seller entity, a second buyer entity associated with a fourth key, and the intermediary entity;
creating, on the blockchain and cryptographically linked to the fourth block, a fifth block storing a second refund code, the second refund code executable by the plurality of nodes to transfer the committed second transaction amount to the second buyer entity when a digital signature produced using the first key and/or the third key is present and no digital signature using the fourth key is present;
creating, on the blockchain and cryptographically linked to the fourth block, a sixth block storing a second payment code, the second payment code executable by the plurality of nodes to transfer the committed second transaction amount to the seller entity when a digital signature produced using the fourth key and/or the third key is present and no digital signature using the first key is present; and
broadcasting the fourth block, the fifth block, and the sixth block to other nodes of the distributed ledger network, wherein each node validates a second transaction that transfers the committed second transaction amount by determining that the second transaction satisfies either the second refund code of the fifth block or the second payment code of the sixth block.

19. The computer system of claim 15, wherein the operations further comprise:
executing the refund code to transfer the committed transaction amount in response to receiving the digital signature produced using the first key and/or the third key.

20. The computer system of claim 15, wherein the operations further comprise:
executing the payment code to transfer the committed transaction amount in response to receiving the digital signature produced using the second key and/or the third key.

* * * * *